United States Patent
Lin

(10) Patent No.: US 11,546,783 B2
(45) Date of Patent: Jan. 3, 2023

(54) METHOD AND APPARATUS FOR IMPROVING PDCCH MONITORING PATTERN IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 16/674,417

(22) Filed: Nov. 5, 2019

(65) Prior Publication Data

US 2020/0154295 A1    May 14, 2020

Related U.S. Application Data

(60) Provisional application No. 62/786,123, filed on Dec. 28, 2018, provisional application No. 62/758,407, filed on Nov. 9, 2018.

(51) Int. Cl.
*H04W 24/08* (2009.01)
*H04W 88/02* (2009.01)

(52) U.S. Cl.
CPC .......... *H04W 24/08* (2013.01); *H04W 88/02* (2013.01)

(58) Field of Classification Search
CPC ...... H04W 52/02; H04W 24/08; H04W 88/02
See application file for complete search history.

(56) References Cited

U.S. PATENT DOCUMENTS

| | | | | |
|---|---|---|---|---|
| 2013/0315092 A1* | 11/2013 | Yu | ................ | H04W 52/0203 370/252 |
| 2019/0090299 A1* | 3/2019 | Ang | .................. | H04L 5/0053 |
| 2020/0195410 A1* | 6/2020 | Li | ..................... | H04L 1/1819 |

FOREIGN PATENT DOCUMENTS

| | | | |
|---|---|---|---|
| WO | 2014042377 A1 | 3/2014 | |
| WO | 2018174456 A1 | 9/2018 | |
| WO | WO-2018187242 A1 * | 10/2018 | ........... H04L 1/0006 |

OTHER PUBLICATIONS

Huawei "Signaling based on mechanisms for power saving" pp. 1-7 (Year: 2018).*
LG "Discussion on UE power saving in NR" pp. 1-4 (Year: 2018).*
Huawei, HiSilicon, "Signaling based mechanisms for UE power saving", 3GPP TSG RAN WG1 Meeting #94bis R1-1810155, Chengdu, China, Oct. 8-12, 2018.
LG Electronics, "Discussion on UE power saving in NR", 3GPP TSG RAN WG1 Meeting #94bis ,R1-1810307, Chengdu, China, Oct. 8-12, 2018.
Corresponding Korean Patent Application No. 10-2019-0140531, Office Action dated Dec. 24, 2020. English Translation.
Corresponding European Patent Application No. 19207025.8, Extended European Search Report dated Jun. 23, 2020.
Ericsson, "Adaption aspects of NR UE power saving", 3GPP TSG-RAN WG1 Meeting #95, R1-1813182, Agenda Item 7.2.9.2.1, Document for Discussion and Decision, Nov. 12-16, 2018, Spokane, WA, USA.

(Continued)

*Primary Examiner* — Ayanah S George
(74) *Attorney, Agent, or Firm* — Cooper Legal Group LLC

(57) ABSTRACT

A method and apparatus are disclosed. In an example from the perspective of a user equipment (UE), a Physical Downlink Control Channel (PDCCH) is monitored with a first pattern during an active time of the UE if a first timer is running. The PDCCH is monitored with a second pattern during the active time of the UE if a second timer is running and/or if the UE is associated with the active time due to a first cause (e.g., the UE is in the active time due to the first cause).

14 Claims, 15 Drawing Sheets

(56) References Cited

OTHER PUBLICATIONS

Vivo, "Discussion on triggering adaption of US power consumption characteristics", 3GPP TSG RAN WG1 #95, R1-181331, Agenda Item 7.2.9.2.2, Document for Discussion and Decision, Nov. 12-16, 2018, Spokane, WA, USA.
Corresponding European Patent Application No. 19207025.8, Communication Pursuant to Article 94(3) EPC, dated Jun. 29, 2021.
Corresponding Korean Patent Application No. 10-2019-0140531, Office Action dated Jun. 21, 2021. English Translation.
LG Electronics, "Discussion on triggering adaption for UE power consumption", 3GPP TSG RAN WG1 Meeting #95, R1-1812588, Spokane, USA, Nov. 12-16, 2018.
InterDigital Inc., "Views on potential physical layer enhancements for URLLC", 3GPP TSG RAN 2GI Meeting #94, R1-1809099, Gothenburg, Sweden, Aug. 20-24, 2018.
Huawei, HiSilicon, "Remaining issues on HARQ management", 3GPP TSG RAN WGI Meeting #92, R1-1802697, Athens, Greece, Feb. 26-Mar. 2, 2018.
Corresponding European Patent Application No. 19207025.8, Communiction Pursuant to Article 94(3) EPC, dated Mar. 1, 2022.

\* cited by examiner

METHOD AND APPARATUS FOR IMPROVING PDCCH MONITORING PATTERN IN A WIRELESS COMMUNICATION SYSTEM

CROSS-REFERENCE TO RELATED APPLICATIONS

The present application claims the benefit of U.S. Provisional Patent Application Ser. No. 62/758,407 filed on Nov. 9, 2018, the entire disclosure of which is incorporated herein in its entirety by reference. The present application also claims the benefit of U.S. Provisional Patent Application Ser. No. 62/786,123 filed on Dec. 28, 2018, the entire disclosure of which is incorporated herein in its entirety by reference.

FIELD

This disclosure generally relates to wireless communication networks, and more particularly, to a method and apparatus for improving Physical Downlink Control Channel (PDCCH) monitoring pattern in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a user equipment (UE), a Physical Downlink Control Channel (PDCCH) is monitored with a first pattern during an active time of the UE if a first timer is running. The PDCCH is monitored with a second pattern during the active time of the UE if a second timer is running and/or if the UE is associated with the active time due to a first cause (e.g., the UE is in the active time due to the first cause).

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.211 V15.2.0, "NR Physical channels and modulation (Release 15)"; R1-1812092, "CR to 38.213 capturing the RAN1#94bis meeting agreements", Samsung; TS 38.321 V15.2.0, "NR MAC protocol specification (Release 15)"; RP-181463, "New SID: Study on UE Power Saving in NR", CATT, CMCC, vivo, CATR, Qualcomm, MediaTek. The standards and documents listed above are hereby expressly incorporated by reference in their entirety.

Figure 1:
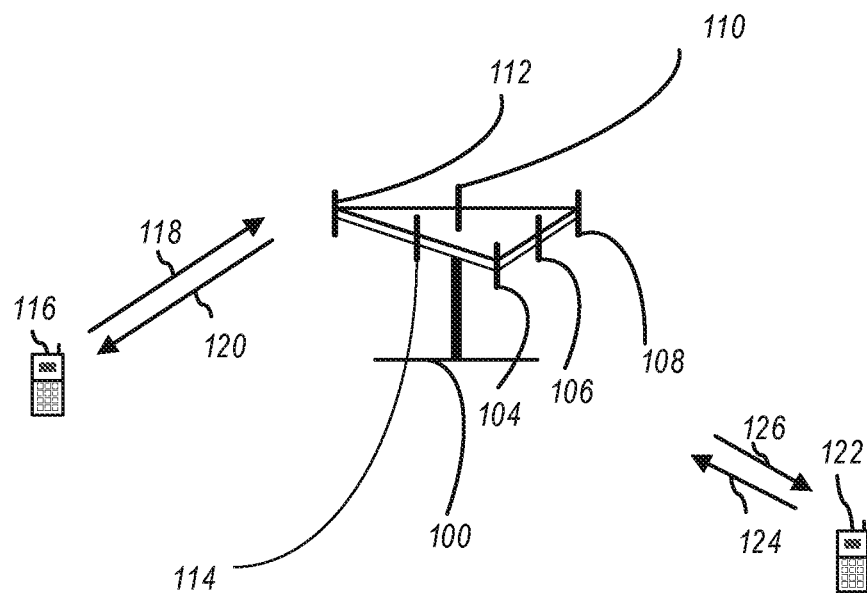
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), or some other terminology. An access terminal (AT) may also be called user equipment (UE), a wireless communication device, terminal, access terminal or some other terminology.

Figure 2:
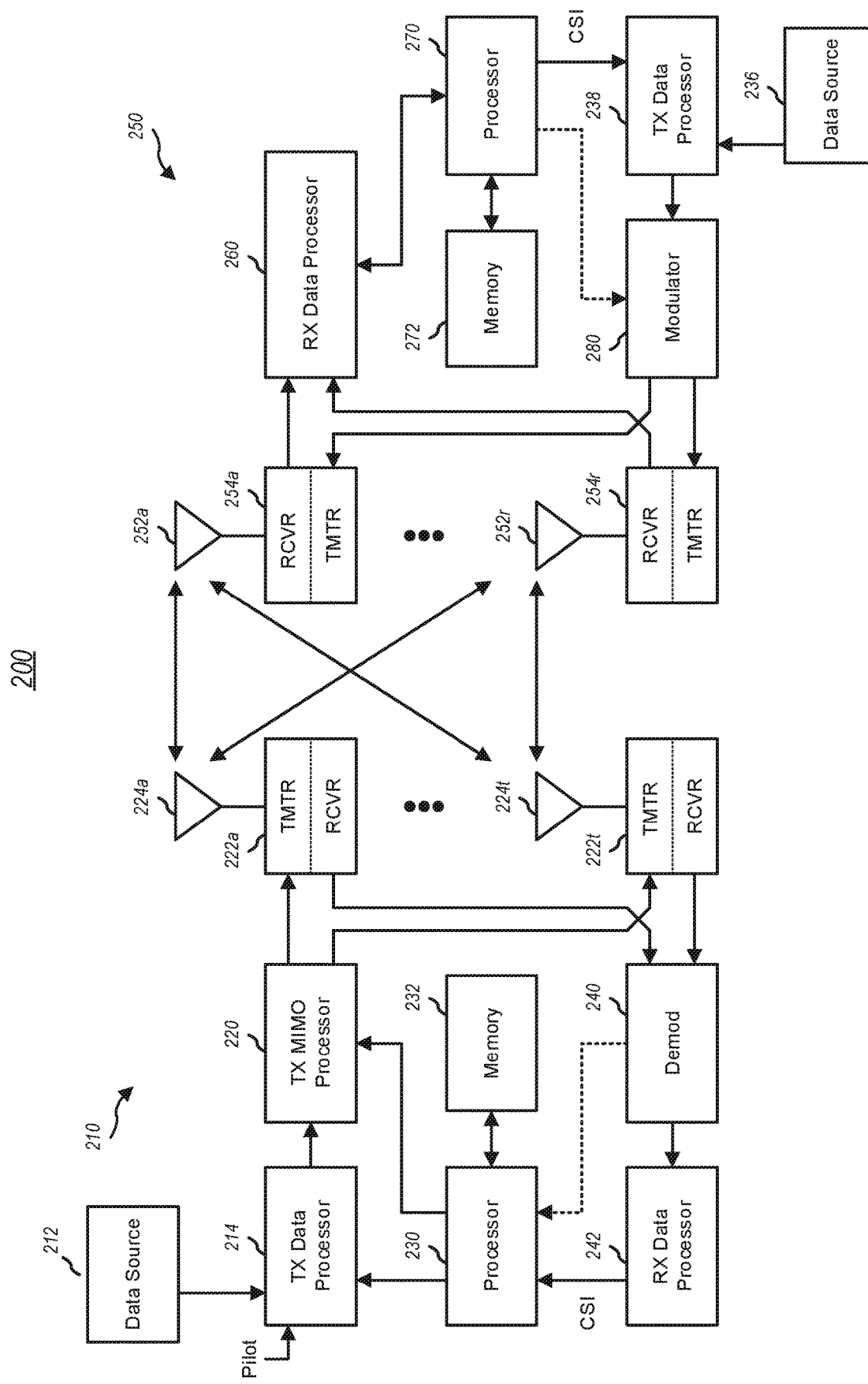
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
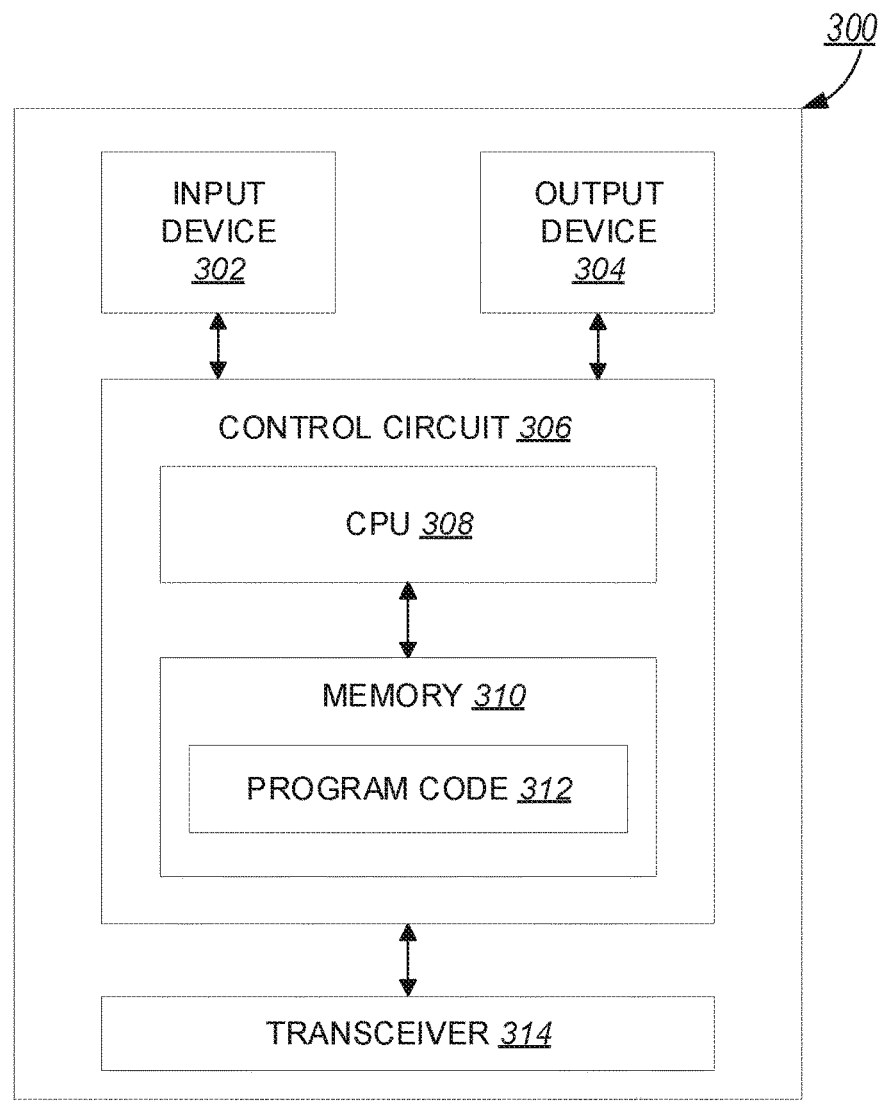
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
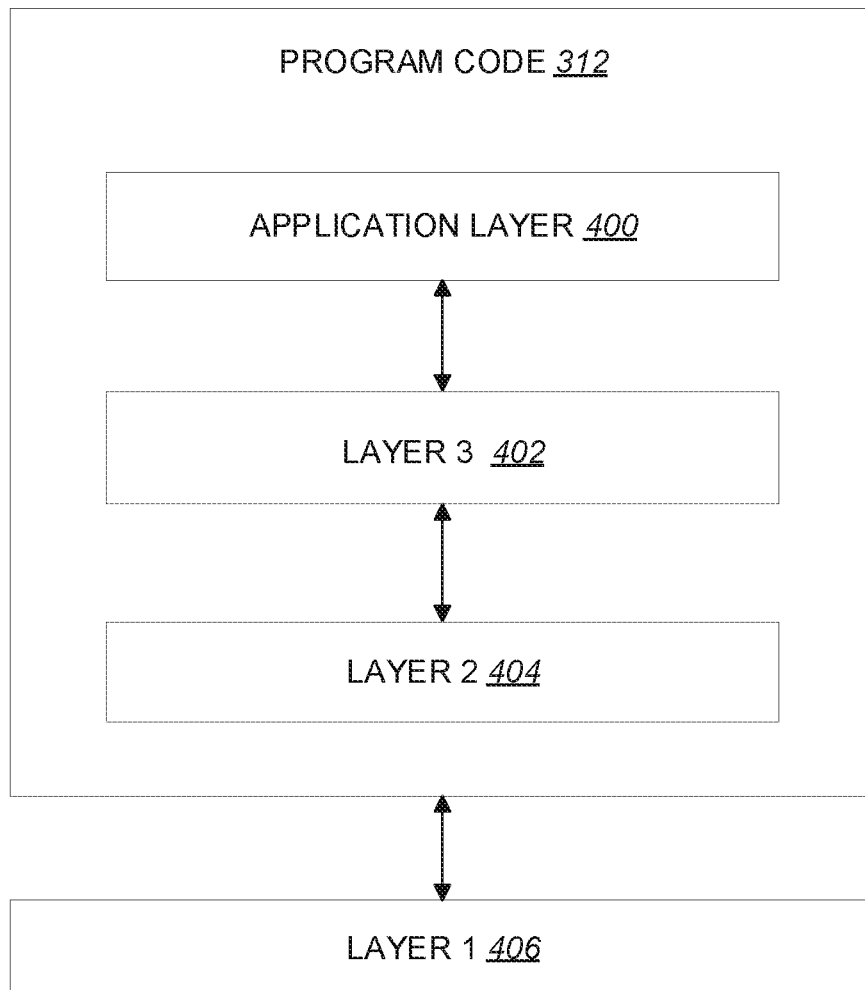
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Frame structure used in New RAT (NR) for 5G, to accommodate various types of requirements for time and/or frequency resources, e.g., from ultra-low latency (~0.5 ms) to delay-tolerant traffic for machine-type communication (MTC), from high peak rate for enhanced Mobile Broad Band (eMBB) to very low data rate for MTC. An important focus of this study is low latency aspect, e.g., short Transmission Time Interval (TTI), while other aspect of mixing/adapting different TTIs can also be considered in the study. In addition to diverse services and requirements, forward compatibility is an important consideration in initial NR frame structure design as not all features of NR would be included in the beginning phase/release. It is very difficult to fulfill all diverse requirements with a single numerology. Therefore, it is agreed in the very first meeting that more than one numerology would be adopted. And considering the standardization effort, implementation efforts, as well as multiplexing capability among different numerologies, it would be beneficial to have some relationship between different numerologies, such as integral multiple relationship.

Figure 5:
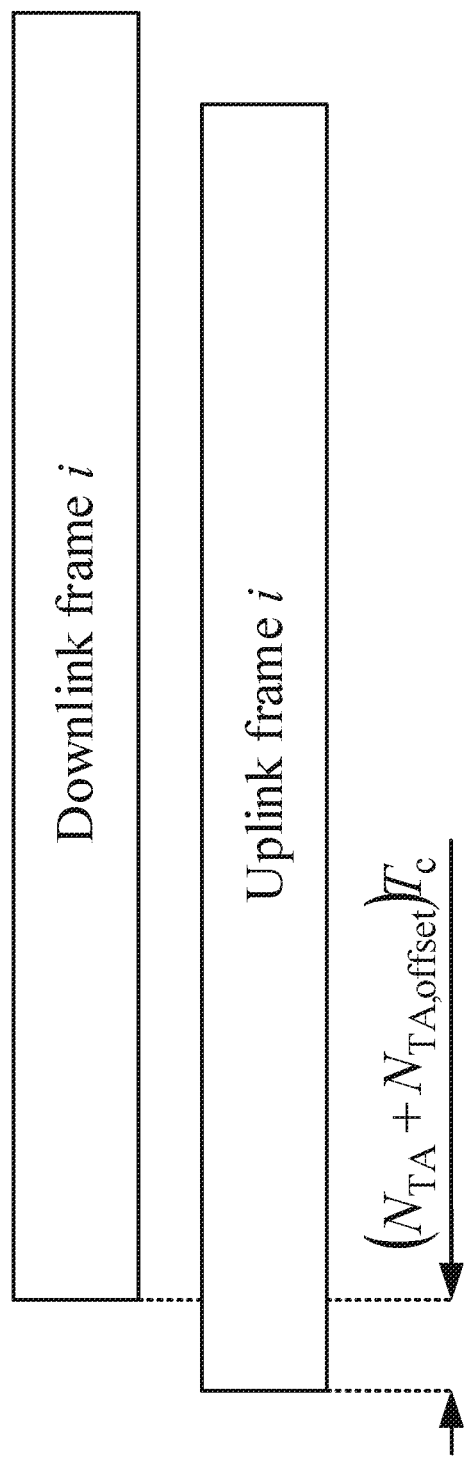
FIG. 5 illustrates a timing relation of an uplink frame and a downlink frame.

More details of NR frame structure, channel and numerology design is given below in 3GPP TS 38.211 V15.2.0. Notably, FIG. 4.3.1-1 of Section 4.3.1 of 3GPP TS 38.211 V15.2.0, entitled "Uplink-downlink timing relation", is reproduced herein as FIG. 5.

4 Frame Structure and Physical Resources
4.1 General
Throughout this specification, unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.
4.2 Numerologies
Multiple OFDM numerologies are supported as given by Table 4.2-1 where µ and the cyclic prefix for a bandwidth part are obtained from the higher-layer parameter subcarrierSpacing and cyclicPrefix, respectively.

TABLE 4.2-1

Supported transmission numerologies.

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

4.3 Frame Structure
4.3.1 Frames and Subframes
Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9. There is one set of frames in the uplink and one set of frames in the downlink on a carrier.

Uplink frame number i for transmission from the UE shall start $T_{TA}=(N_{TA}+N_{TA,offset})T_c$ before the start of the corresponding downlink frame at the UE where $N_{TA,offset}$ is given by [5, TS 38.213].

4.3.2 Slots
For subcarrier spacing configuration µ, slots are numbered $n_s^\mu \in \{0, \ldots, N_{slot}^{subframe,\mu}-1\}$ in increasing order within a subframe and $n_{s,f}^\mu \in \{0, \ldots, N_s^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

A UE not capable of full-duplex communication is not expected to transmit in the uplink earlier than $N_{RX-Tx}T_c$ after the end of the last received downlink symbol in the same cell where $N_{RX-Tx}$ is given by Table 4.3.2-3.

A UE not capable of full-duplex communication is not expected to receive in the downlink earlier than $N_{TX-Rx}T_c$ after the end of the last transmitted uplink symbol in the same cell where $N_{TX-Rx}$ is given by Table 4.3.2-3.

TABLE 4.3.2-1

Number of OFDM symbols per slot, slots per frame, and slots per subframe for normal cyclic prefix.

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2

Number of OFDM symbols per slot, slots per frame, and slots per subframe for extended cyclic prefix.

| µ | $N_{symb}^{slot}$ | $N_{slot}^{frame,\mu}$ | $N_{slot}^{subframe,\mu}$ |
|---|---|---|---|
| 2 | 12 | 40 | 4 |

TABLE 4.3.2-3

Transition time $N_{Rx-Tx}$ and $N_{Tx-Rx}$

| Transition time | FR1 | FR2 |
|---|---|---|
| $N_{Tx-Rx}$ | 25600 | 13792 |
| $N_{Rx-Tx}$ | 25600 | 13792 |

Given 5G supports a wide range of services, traffic may come with different requirements, for example enhanced Mobile Broad Band (eMBB) is one type of traffic with large amount of data while less strict latency requirement, similar as convention mobile network traffic. Ultra Reliable and Low Latency Communication (URLLC) is another type of traffic with extreme latency and reliability requirement and medium or small amount of data. Since different requirements need to be achieved, a more flexible design for PDCCH is introduced for 5G. UE would monitor PDCCH which is used to schedule UL/DL data traffic or reveal some command from a base station. Therefore, property of PDCCH monitoring pattern could determine or fit certain traffic type or characteristic. For example, PDCCH monitoring pattern could affect a latency of scheduling. If a UE is configured with a PDCCH monitoring pattern every 0.5 ms, an average latency of scheduling could be 0.25 ms, e.g. between arrival of DL data and the first scheduling opportunity of the DL data. Therefore a more flexible configuration is developed so that a base station could configure a proper monitoring pattern for a UE, e.g. depending on requirements or property of service(s) for the UE. A PDCCH monitoring pattern, e.g. for a search space, could be determined by a periodicity and an offset which could be used to determine in which slot PDCCH is monitored, e.g. for a search space. A time duration of a search space could be used to determine a number of consecutive slot(s) where PDCCH is monitored for the search space within a periodicity. Also, there is a bit map indicating monitoring pattern within a slot. For example, for a search space associated a control resource set (CORESET) duration 2 symbol and PDCCH monitoring pattern within a slot is given by "10000001000000", there would be two PDDCH monitoring occasion in a slot PDCCH is monitored. One monitoring occasion is on the first symbol (e.g. OFDM symbol 0) and the second symbol (e.g. OFDM symbol 1) and the other monitoring occasion is on the eighth (e.g. OFDM symbol 7) and the ninth symbol (e.g. OFDM symbol 8). More details of PDCCH related procedure could be found in the following R1-1812092 and 3GPP TS 38.211 V15.2.0:

10.1 UE Procedure for Determining Physical Downlink Control Channel Assignment

A set of PDCCH candidates for a UE to monitor is defined in terms of PDCCH search space sets. A search space set can be a CSS set or a USS set. A UE monitors PDCCH candidates in one or more of the following search spaces sets

- a Type0-PDCCH CSS set configured by pdcch-ConfigSIB1 in MasterInformationBlock or by searchSpaceSIB1 in PDCCH-ConfigCommon or by searchSpaceZero in PDCCH-ConfigCommon for a DCI format with CRC scrambled by a SI-RNTI on the primary cell of the MCG
- a Type0A-PDCCH CSS set configured by searchSpaceOtherSystemInformation in PDCCH-ConfigCommon for a DCI format with CRC scrambled by a SI-RNTI on the primary cell of the MCG
- a Type1-PDCCH CSS set configured by ra-SearchSpace in PDCCH-ConfigCommon for a DCI format with CRC scrambled by a RA-RNTI or a TC-RNTI on the primary cell
- a Type2-PDCCH CSS set configured by paging-SearchSpace in PDCCH-ConfigCommon for a DCI format with CRC scrambled by a P-RNTI on the primary cell of the MCG
- a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and
- a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

If a UE is configured with one or more downlink bandwidth parts (BWPs), as described in Subclause 12, the UE can be configured with PDCCH-ConfigCommon and PDCCH-Config for each configured DL BWP on the primary cell, other than the initial DL BWP, as described in Subclause 12.

TABLE 10.1-1

CCE aggregation levels and maximum number of PDCCH candidates per CCE aggregation level for CSS sets configured by searchSpace-SIB1

| CCE Aggregation Level | Number of Candidates |
|---|---|
| 4 | 4 |
| 8 | 2 |
| 16 | 1 |

For each DL BWP configured to a UE in a serving cell, a UE can be provided by higher layer signalling with P 3 CORESETs. For each CORESET, the UE is provided the following by ControlResourceSet:
- a CORESET index p, 0≤p<12, by controlResourceSetId;
- a DM-RS scrambling sequence initialization value by pdcch-DMRS-ScramblingID;
- a precoder granularity for a number of REGs in the frequency domain where the UE can assume use of a same DM-RS precoder by precoderGranularity;
- a number of consecutive symbols provided by duration;
- a set of resource blocks provided by frequencyDomainResources;
- CCE-to-REG mapping parameters provided by cce-REG-MappingType;
- an antenna port quasi co-location, from a set of antenna port quasi co-locations provided by TCI-State, indicating quasi co-location information of the DM-RS antenna port for PDCCH reception in a respective CORESET;
- an indication for a presence or absence of a transmission configuration indication (TCI) field for DCI format 1_1 transmitted by a PDCCH in CORESET p, by TCI-PresentInDCI.

For each CORESET in a DL BWP of a serving cell, a respective frequencyDomainResources provides a bitmap. The bits of the bitmap have a one-to-one mapping with non-overlapping groups of 6 consecutive PRBs, in ascending order of the PRB index in the DL BWP bandwidth of $N_{RB}^{BWP}$ PRBs with starting common RB position $N_{BWP}^{start}$ where the first common RB of the first group of 6 PRBs has common RB index $6 \cdot \lceil N_{BWP}^{start}/6 \rceil$.

For each DL BWP configured to a UE in a serving cell, the UE is provided by higher layers with S 10 search space sets where, for each search space set from the S search space sets, the UE is provided the following by SearchSpace:
- a search space set index s, 0≤s<40, by searchSpaceId
- an association between the search space set s and a CORESET p by controlResourceSetId
- a PDCCH monitoring periodicity of $k_x$ slots and a PDCCH monitoring offset of $o_s$ slots, by monitoringSlotPeriodicityAndOffset—a PDCCH monitoring pattern within a slot, indicating first symbol(s) of the CORESET within a slot for PDCCH monitoring, by monitoringSymbolsWithinSlot a duration of $T_s < k_s$ slots indicating a number of slots that the search space set s exists by duration a number of PDCCH candidates $M_s^{(L)}$ per CCE aggregation level L bys aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively an indication that search space set s is either a CSS set or a USS set by searchSpaceType if search space set s is a CSS set an indication by dci-Format0-0-AndFormat1-0 to monitor PDCCH candidates for DCI format 0_0 and DCI format 1_0 an indication by dci-Format2-0 to monitor one or two PDCCH candidates for DCI format 2_0 and a corresponding CCE aggregation level an indication by dci-Format2-1 to monitor PDCCH candidates for DCI format 2_1 an indication by dci-Format2-2 to monitor PDCCH candidates for DCI format 2_2 an indication by dci-Format2-3 to monitor PDCCH candidates for DCI format 2_3 if search space set s is a USS set, an indication by dci-Formats to monitor PDCCH candidates either for DCI format 0_0 and DCI format 1_0, or for DCI format 0_1 and DCI format 1_1

If the monitoringSymbolsWithinSlot indicates to a UE to monitor PDCCH in a subset of up to three consecutive symbols that are same in every slot where the UE monitors PDCCH for all search space sets, the UE does not expect to be configured with a PDCCH SCS other than 15 kHz if the subset includes at least one symbol after the third symbol.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^\mu$ [4, TS 38.211] in a frame with number $n_f$ if $(n_f N_{slot}^{frame,\mu} + n_{s,f}^\mu - o_s) \bmod k_s = 0$. The UE monitors PDCCH for search space set s for T consecutive slots, starting from slot $n_{s,f}^\mu$, and does not monitor PDCCH for search space set s for the next $k_s - T_s$ consecutive slots.

A USS at CCE aggregation level $L \in \{1, 2, 4, 8, 16\}$ is defined by a set of PDCCH candidates for CCE aggregation level L.

If a UE is configured with CrossCarrierSchedulingConfig for a serving cell the carrier indicator field value corresponds to the value indicated by CrossCarrierSchedulingConfig.

A UE does not expect to monitor PDCCH candidates on an active DL BWP of a secondary cell if the UE is configured to monitor PDCCH candidates with carrier indicator field corresponding to that secondary cell in another serving cell. For the active DL BWP of a serving cell on which the UE monitors PDCCH candidates, the UE monitors PDCCH candidates at least for the same serving cell.

For a search space set s associated with CORESET p, the CCE indexes for aggregation level L corresponding to PDCCH candidate $m_{s,n_{CI}}$ of the search space set in slot $n_{s,f}^\mu$ for an active DL BWP of a serving cell corresponding to carrier indicator field value $n_{CI}$ are given by $$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i$$

where for any CSS, $Y_{p,n_{s,f}^\mu} = 0$;

for a USS, $Y_{p,n_{s,f}^\mu} = (A_p \cdot Y_{p,n_{s,f}^\mu - 1}) \bmod D$, $Y_{p,-1} = n_{RNTI} \neq 0$, $A_p = 39827$ for p mod 3=0, $A_p = 39829$ for p mod 3=1, $A_p = 39839$ for p mod 3=2, and D=65537;

$i = 0, \ldots, L-1$;

$N_{CCE,p}$ is the number of CCEs, numbered from 0 to $N_{CCE,p} - 1$, in CORESET p $n_{CI}$ is the carrier indicator field value if the UE is configured with a carrier indicator field by CrossCarrierSchedulingConfig for the serving cell on which PDCCH is monitored; otherwise, including for any CSS, $n_{CI} = 0$ $m_{s,n_{CI}} = 0, \ldots, M_{s,n_{CI}}^{(L)} - 1$, where $M_{s,n_{CI}}^{(L)}$ is the number of PDCCH candidates the UE is configured to monitor for aggregation level L of a search space set s for a serving cell corresponding to $n_{CI}$ for any CSS, $M_{s,max}^{(L)} = M_{s,0}^{(L)}$ for a USS, $M_{s,max}^{(L)}$ is the maximum of $M_{s,n_{CI}}^{(L)}$ over all configured $n_{CI}$ values for a CCE aggregation level L of search space set s the RNTI value used for $n_{RNTI}$ is the C-RNTI.

A UE expects to monitor PDCCH candidates for up to 4 sizes of DCI formats that include up to 3 sizes of DCI formats with CRC scrambled by C-RNTI per serving cell. The UE counts a number of sizes for DCI formats per serving cell based on a number of configured PDCCH candidates in respective search space sets for the corresponding active DL BWP.

A PDCCH candidate with index $m_{s,n_{CI}}$ for a search space set $s_j$ using a set of CCEs in a CORESET p on the active DL BWP for serving cell $n_{CI}$ is not counted as a monitored PDCCH candidate if there is a PDCCH candidate with index $m_{s,n_{CI}}$ for a search space set $s_i < s_j$, or if there is a PDCCH candidate with index $n_{s,n_{CI}}$ and $n_{s_j,n_{CI}} < m_{s_j,n_{CI}}$ in the CORESET p on the active DL BWP for serving cell $n_{CI}$ using a same set of CCEs, the PDCCH candidates have identical scrambling, and the corresponding DCI formats for the PDCCH candidates have a same size; otherwise, the PDCCH candidate with index $m_{s_j,n_{CI}}$ is counted as a monitored PDCCH candidate.

Table 10.1-2 provides the maximum number of monitored PDCCH candidates, $M_{PDCCH}^{max,slot,\mu}$, for a DL BWP with SCS configuration $\mu$ for a UE per slot for operation with a single serving cell.

TABLE 10.1-2

Maximum number $M_{PDCCH}^{max, slot, \mu}$ of monitored PDCCH candidates per slot for a DL BWP with SCS configuration $\mu \in \{0, 1, 2, 3\}$ for a single serving cell

| $\mu$ | Maximum number of monitored PDCCH candidates per slot and per serving cell $M_{PDCCH}^{max, slot, \mu}$ |
|---|---|
| 0 | 44 |
| 1 | 36 |
| 2 | 22 |
| 3 | 20 |

Table 10.1-3 provides the maximum number of non-overlapped CCEs, $C_{PDCCH}^{max,slot,\mu}$, for a DL BWP with SCS configuration $\mu$ that a UE is expected to monitor corresponding PDCCH candidates per slot for operation with a single serving cell.

CCEs for PDCCH candidates are non-overlapped if they correspond to different CORESET indexes, or different first symbols for the reception of the respective PDCCH candidates.

TABLE 10.1-3

Maximum number $C_{PDCCH}^{max,\,slot,\,\mu}$ of non-overlapped CCEs per slot for a DL BWP with SCS configuration $\mu\varepsilon\{0, 1, 2, 3\}$ for a single serving cell

| $\mu$ | Maximum number of non-overlapped CCEs per slot and per serving cell $C_{PDCCH}^{max,\,slot,\,\mu}$ |
|---|---|
| 0 | 56 |
| 1 | 56 |
| 2 | 48 |
| 3 | 32 |

7.3.2 Physical Downlink Control Channel (PDCCH)
7.3.2.1 Control-Channel Element (CCE)

A physical downlink control channel consists of one or more control-channel elements (CCEs) as indicated in Table 7.3.2.1-1.

TABLE 7.3.2.1-1

Supported PDCCH aggregation levels.

| Aggregation level | Number of CCEs |
|---|---|
| 1 | 1 |
| 2 | 2 |
| 4 | 4 |
| 8 | 8 |
| 16 | 16 |

7.3.2.2 Control-Resource Set (CORESET)

A control-resource set consists of $N_{RB}^{CORESET}$ resource blocks in the frequency domain, given by the higher-layer parameter frequencyDomainResources in the ControlResourceSet IE, and $N_{symb}^{CORESET} \in \{1, 2, 3\}$ symbols in the time domain, given by the higher-layer parameter duration in the ControlResourceSet IE, where $N_{symb}^{CORESET}=3$ is supported only if higher-layer parameter dmrs-TypeA-Position equals 3.

A control-channel element consists of 6 resource-element groups (REGs) where a resource-element group equals one resource block during one OFDM symbol. Resource-element groups within a control-resource set are numbered in increasing order in a time-first manner, starting with 0 for the first OFDM symbol and the lowest-numbered resource block in the control resource set.

A UE can be configured with multiple control-resource sets. Each control-resource set is associated with one CCE-to-REG mapping only.

The CCE-to-REG mapping for a control-resource set can be interleaved or non-interleaved, configured by the higher-layer parameter cce-REG-MappingType in the ControlResourceSet IE, and is described by REG bundles:

REG bundle i is defined as REGs $\{iL, iL+1, \ldots, iL+L-1\}$ where L is the REG bundle size, $i=0, 1, \ldots, N_{REG}^{CORESET}/L-1$, and $N_{RB}^{CORESET}=N_{RB}^{CORESET}N_{symb}^{CORESET}$ is the number of REGs in the CORESET CCE j consists of REG bundles $\{f(6j/L), f(6j/L+1), \ldots, f(6j/L+6/L-1)\}$ where $f(\bullet)$ is an interleaver For non-interleaved CCE-to-REG mapping, L=6 and f(j)=j. For interleaved CCE-to-REG mapping, $L\in\{2,6\}$ for $N_{symb}^{CORESET}=1$ and $L\in\{N_{symb}^{CORESET},6\}$ for $N_{symb}^{CORESET}\in\{2,3\}$ where L is configured by the higher-layer parameter reg-BundleSize. The interleaver is defined by $$f(j)=(rC+c+n_{shift})\bmod(N_{REG}^{CORESET}/L)$$

$j=cR+r$
$r=0, 1, \ldots, R-1$
$c=0, 1, \ldots, C-1$
$C=N_{REG}^{RESET}/(LR)$ where $R\in\{2,3,6\}$ is given by the higher-layer parameter interleaverSize and where
  $n_{shift}=N_{ID}^{cell}$ for a PDCCH transmitted in a CORESET configured by the PBCH or SIB 1, and
  otherwise $n_{shift}\in\{0, 1, \ldots, 274\}$ is given by the higher-layer parameter shiftIndex.

To reduce power consumption, DRX (Discontinuous Reception), or C-DRX (Connected mode-DRX) is introduced to avoid continuous reception, especially (unicast/UE-specific) PDCCH, which could be used for scheduling UL/DL data traffic for the UE. Under the framework of DRX, active time is defined or counted by a UE. UE needs to monitor PDCCH during active time. Outside active time, e.g. in-active time or non-active time, UE does not monitor PDCCH so that power could be saved. Several timers or procedures are developed, which allows UE to realize when is active time, e.g. for different purposes such as initial traffic/bursty traffic/retransmission/random access/receiving UL grant. More detail of DRX could be found in the following quotation from TS 38.321 V15.2.0:

5.7 Discontinuous Reception (DRX)

The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other subclauses of this specification. When in RRC_CONNECTED, if DRX is configured, the MAC entity may monitor the PDCCH discontinuously using the DRX operation specified in this subclause; otherwise the MAC entity shall monitor the PDCCH continuously.

RRC controls DRX operation by configuring the following parameters:
  drx-onDuration Timer: the duration at the beginning of a DRX Cycle;
  drx-SlotOffset: the delay before starting the drx-onDurationTimer;
  drx-InactivityTimer: the duration after the PDCCH occasion in which a PDCCH indicates a new UL or DL transmission for the MAC entity;
  drx-RetransmissionTimerDL (per DL HARQ process): the maximum duration until a DL retransmission is received;
  drx-RetransmissionTimerUL (per UL HARQ process): the maximum duration until a grant for UL retransmission is received;
  drx-LongCycleStartOffset: the Long DRX cycle and drx-StartOffset which defines the subframe where the Long and Short DRX Cycle starts;
  drx-ShortCycle (optional): the Short DRX cycle;
  drx-ShortCycleTimer (optional): the duration the UE shall follow the Short DRX cycle;
  drx-HARQ-RTT-TimerDL (per DL HARQ process): the minimum duration before a DL assignment for HARQ retransmission is expected by the MAC entity;
  drx-HARQ-RTT-TimerUL (per UL HARQ process): the minimum duration before a UL HARQ retransmission grant is expected by the MAC entity.

When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer (as described in subclause 5.1.5) is running; or a Scheduling Request is sent on PUCCH and is pending (as described in subclause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in subclause 5.1.4).

When DRX is configured, the MAC entity shall:
1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.
1> if a MAC PDU is transmitted in a configured uplink grant:
2> start the drx-HARQ-RTT-TimerUL for the corresponding HARQ process in the first symbol after the end of the first repetition of the corresponding PUSCH transmission;
2> stop the drx-RetransmissionTimerUL for the corresponding HARQ process.
1> if a drx-HARQ-RTT-TimerDL expires:
2> if the data of the corresponding HARQ process was not successfully decoded:
3> start the drx-RetransmissionTimerDL for the corresponding HARQ process in the first symbol after the expiry of drx-HARQ-RTT-TimerDL.
1> if a drx-HARQ-RTT-TimerUL expires:
2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
2> stop drx-onDurationTimer;
2> stop drx-InactivityTimer.
1> if drx-InactivityTimer expires or a DRX Command MAC CE is received:
2> if the Short DRX cycle is configured:
3> start or restart drx-ShortCycleTimer in the first symbol after the expiry of drx-InactivityTimer or in the first symbol after the end of DRX Command MAC CE reception;
3> use the Short DRX Cycle.
2> else:
3> use the Long DRX cycle.
1> if drx-ShortCycleTimer expires:
2> use the Long DRX cycle.
1> if a Long DRX Command MAC CE is received:
2> stop drx-ShortCycleTimer;
2> use the Long DRX cycle.
1> if the Short DRX Cycle is used, and [(SFN×10)+ subframe number] modulo (drx-ShortCycle)=(drx-StartOffset) modulo (drx-ShortCycle); or
1> if the Long DRX Cycle is used, and [(SFN×10)+ subframe number] modulo (drx-LongCycle)=drx-StartOffset:
2> start drx-onDurationTimer after drx-SlotOffset from the beginning of the subframe.

1> if the MAC entity is in Active Time:
2> monitor the PDCCH;
2> if the PDCCH indicates a DL transmission:
3> start the drx-HARQ-RTT-TimerDL for the corresponding HARQ process in the first symbol after the end of the corresponding transmission carrying the DL HARQ feedback;
3> stop the drx-RetransmissionTimerDL for the corresponding HARQ process.
2> if the PDCCH indicates a UL transmission:
3> start the drx-HARQ-RTT-TimerUL for the corresponding HARQ process in the first symbol after the end of the first repetition of the corresponding PUSCH transmission;
3> stop the drx-RetransmissionTimerUL for the corresponding HARQ process.
2> if the PDCCH indicates a new transmission (DL or UL):
3> start or restart drx-InactivityTimer in the first symbol after the end of the PDCCH reception.

The MAC entity needs not to monitor the PDCCH if it is not a complete PDCCH occasion (e.g. the Active Time starts or ends in the middle of a PDCCH occasion).

A study on power consumption has been conducted and one of key component is to reduce the power consumed by monitoring PDCCH, more clear justifications and objectives are given below RP-181463:

1) Identify techniques for UE power saving study with focus in RRC_CONNECTED mode [RAN1, RAN2]
   a) Study UE adaptation to the traffic and UE power consumption characteristics in frequency, time, antenna domains, DRX configuration, and UE processing timeline for UE power saving
      (Note: existing UE capabilities are assumed for UE processing timeline)
      i) Network and/or UE assistance information
      ii) Include mechanism in reducing PDCCH monitoring, taking into account current DRX scheme
   b) Study the power saving signal/channel/procedure for triggering adaptation of UE power consumption characteristics As mentioned in the foregoing description, a UE determines when Physical Downlink Control Channel (PDCCH) is monitored based on several factors. One factor may be search space/control resource set (CORESET) related configuration and another factor may be discontinuous reception (DRX). Search space/CORESET related configuration could indicate and/or determine a pattern of PDCCH monitoring (e.g., the UE may determine the pattern of PDCCH monitoring based on a search space/CORESET related configuration). DRX operation could indicate and/or determine a pattern of active time (e.g., the UE may determine the pattern of active time using the DRX operation). In an example, a UE would monitor PDCCH in occasion(s) belonging to intersection between the pattern of PDCCH monitoring and the pattern of active time. That is to say, a UE would monitor PDCCH on symbol(s) if the symbol(s) is configured for monitoring PDCCH and the symbol(s) is during active time. However, this method may come with a restriction that a uniform PDCCH monitoring pattern would be adopted during active time irrespective of why a symbol(s)/a slot(s) is during active time or why a symbol(s)/a slot(s) be within (and/or belong to) an active time. For example, an active time may be within a period when the data traffic burst has not started yet and/or an active time may be within a period when the data traffic burst has started already. Using a same PDCCH monitoring pattern to cover both cases (e.g., both the period when the data traffic burst has not started and/or the period when the data traffic burst has started) would lead to inefficient operation. That is to say, a denser monitoring pattern would result in excessive power consumption when the data burst has not started yet while a sparser monitoring pattern results in longer delay and/or lower data rate when data burst has started already. For example, it may be more efficient to have a first PDCCH monitoring pattern for the period when the data burst has not started and a second PDCCH monitoring pattern for the period when the data burst has started, where the first PDCCH monitoring pattern corresponds to less PDCCH monitoring occasions than the second PDCCH monitoring pattern.

In an example, a UE is configured to monitor four PDCCH occasions within a slot. In a first slot when an on duration timer is running, the UE would monitor the four PDCCH occasions (e.g., the UE monitors the four PDCCH occasions unless there is an exception resulting in UE skipping a PDCCH monitoring occasion in the first slot). In a second slot, when an inactivity timer is running, the UE would monitor the four PDCCH occasions (e.g., unless an exception occurs). However, on duration (and/or a period when the on duration timer is running) could correspond to a period when data burst has not started yet. Alternatively and/or additionally, when the inactivity timer is running, it is very likely there is traffic (e.g., a data burst) ongoing. For PDCCH monitoring pattern configured by Radio Resource Control (RRC), at least monitoring pattern for data burst (which may be frequent) may need to be fulfilled. That is to say, the PDCCH monitoring pattern may be suitable and/or efficient for the second slot when the inactivity timer is running (e.g., during data burst), and/or the PDCCH monitoring pattern may be inefficient for the case when the on duration timer is running, (e.g., before data burst). For example, the PDCCH monitoring pattern may correspond to a number of PDCCH monitoring occasions (e.g., four and/or a different number of PDCCH monitoring occasions), where the number of PDCCH monitoring occasions is suitable and/or efficient for the second slot and/or the number of PDCCH monitoring occasions is inefficient for the first slot. For example, the number of PDCCH monitoring occasions of the PDCCH monitoring pattern may be associated with a frequency (of monitoring occasions) of the PDCCH monitoring pattern. In some examples, applying the PDCCH monitoring pattern (that is suitable for the case when the inactivity timer is running) for the case when the on duration timer is running may lead to extra and/or unnecessary power consumption. For example, applying the same PDCCH monitoring pattern in (both) a period when the inactivity timer is running and in a period when the on duration timer is running may lead to extra and/or inefficient power consumption. The foregoing example merely describes issues associated with inactivity timer and on duration timer, while it could be generally understood that required PDCCH monitoring patterns for periods associated with different timers (e.g., different timers used to derive active time) and/or different causes of active time may be different (e.g., required PDCCH monitoring patterns may have different numbers and/or frequencies of PDCCH monitoring occasions for different timers and/or different causes of active time). For example, a required PDCCH monitoring pattern for on duration timer and a required PDCCH monitoring pattern after a scheduling request is sent on Physical Uplink Control Channel (PUCCH) (and is pending) could be different. A more frequent PDCCH monitoring pattern (e.g., a monitoring pattern with a higher number and/or frequency of monitoring occasions) is beneficial after a scheduling request is sent on PUCCH (and is pending) since an uplink (UL) grant is expected to arrive and the more frequent PDCCH monitoring pattern could reduce the latency. Therefore applying a same pattern for these cases may lead to inefficient operation.

Figure 6:
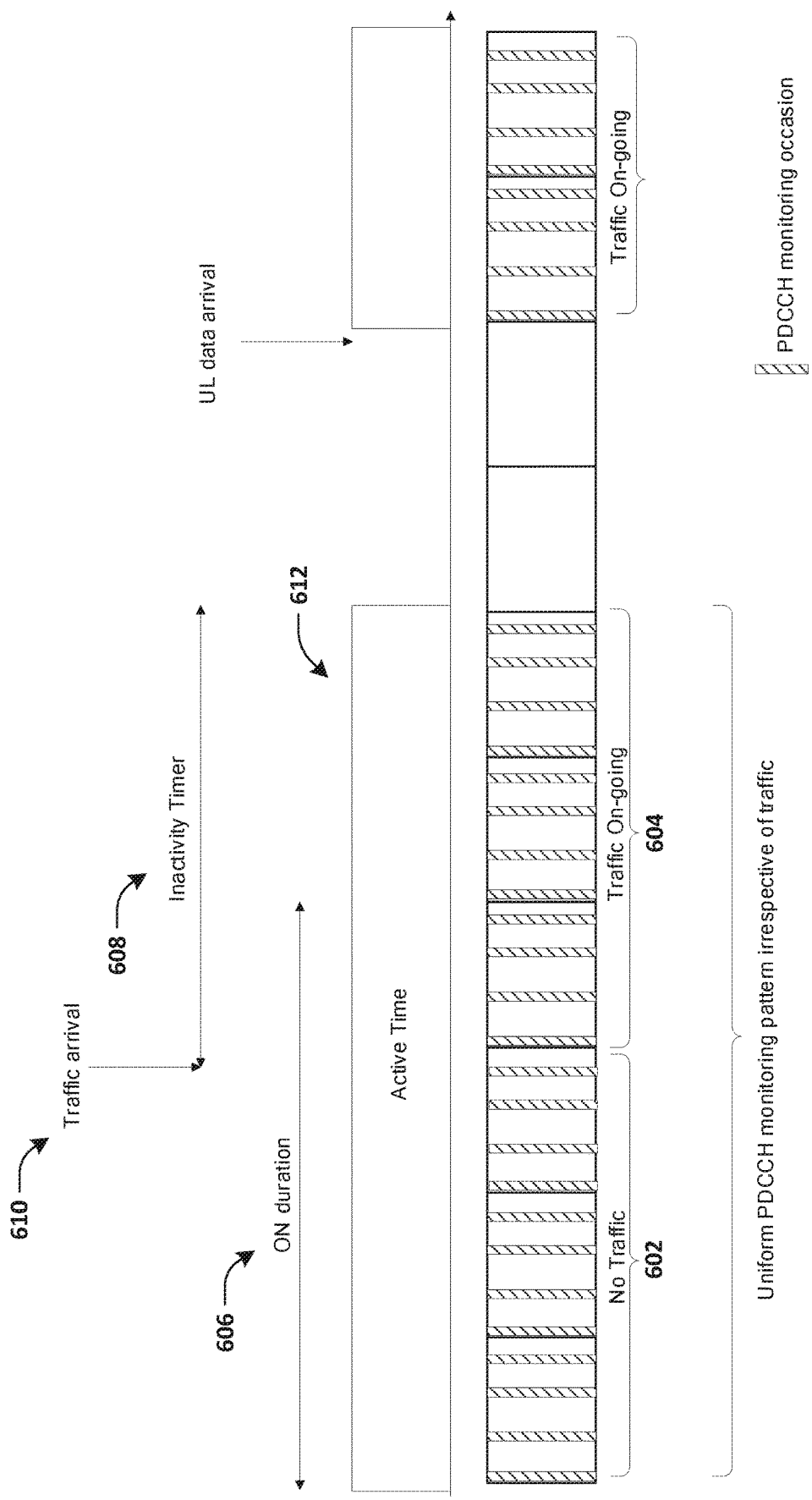
FIG. 6 illustrates application of a Physical Downlink Control Channel (PDCCH) monitoring pattern.

An illustration of this issue is presented in FIG. 6. FIG. 6 illustrates application of a PDCCH monitoring pattern. In FIG. 6, the PDCCH monitoring pattern is used for a first period 602 during which an on duration timer 606 is running and/or an inactivity timer 608 is not running. Alternatively and/or additionally, the PDCCH monitoring pattern is used for a second period 604 during which the inactivity timer 608 is running. The first period 602 and/or the second period 604 may be during active time 612. The inactivity timer 608 may be triggered responsive to a traffic arrival 610 (e.g., reception of data). However, data traffic during the first period 602 (e.g., transmission and/or reception of data during the first period 602) may be less than a threshold amount of data traffic (and/or no data traffic) and/or data traffic during the second period 604 may be greater than the threshold amount of data traffic (and/or the second period 604 may have an ongoing data burst). A frequency of monitoring occasions of the PDCCH monitoring pattern may be suitable for the second period 604 and/or inefficient for the first period 602. Thus, applying the PDCCH monitoring pattern for (both) the first period 602 and the second period 604 may lead to inefficient operation during the first period 602.

In a first embodiment of the present disclosure, a UE may monitor PDCCH with different (PDCCH monitoring) patterns in active time due to different timers and/or due to different causes of active time. A UE monitors PDCCH with a first pattern when a first timer is running and/or when active time is due to a first cause and the UE monitors PDCCH with a second pattern when a second timer is running and/or when active time is due to a second cause. When a plurality of patterns is determined, e.g., due to one or more timers running and/or one or more causes, the UE determines one pattern to monitor PDCCH based on the plurality of patterns. The one pattern may be a pattern within the plurality of patterns. The one pattern may be selected according to priorities of the running timer(s) and/or cause(s). The one pattern may be a most frequent monitoring pattern within the plurality of patterns. The one pattern may be a least frequent monitoring pattern within the plurality of patterns. The one pattern may be derived from the plurality of patterns, e.g., one or more of a union of the plurality of patterns, an intersection of the plurality of patterns, etc. Notably, the foregoing example of the first embodiment including two timers (e.g., the first timer and the second timer) and/or two causes (e.g., the first cause and the second cause) is an attempt to explain the first embodiment more simply. The first embodiment could be extended to N timer(s)/cause(s) with M patterns. M could be N. M could be less than N if one or more timer(s)/causes share a same pattern. N timer(s)/cause(s) could be grouped into M groups and each group of the M groups shares a same pattern.

In some examples, the timers are used to determine active time.

When the timers are running, UE would monitor PDCCH, e.g., the UE may consider it is active time.

The cause of active time may correspond to an event resulting in active time.

Throughout the present disclosure, a timer could be one or more of the following timers: on duration timer; inactivity timer; retransmission timer for downlink (DL); retransmission timer for UL; Hybrid Automatic Repeat Request (HARQ)-round trip time (RTT) timer for DL; HARQ-RTT timer for UL; short cycle timer; and/or configured grant timer (and/or a different timer).

Throughout the present disclosure, a cause of active time could be one or more of the following: a Scheduling Request is sent on PUCCH (and/or is pending); UE is waiting for UL grant for newly arrival data; UE performs random access procedure; UE performs part of random access procedure; and/or a PDCCH indicating a new transmission addressed to the Cell Radio Network Temporary Identifier (C-RNTI) of the Medium Access Control (MAC) entity has not been received after successful reception of a Random Access Response for the Random Access Preamble not selected by the MAC entity among the contention-based Random Access Preamble (and/or a different cause of active time).

Throughout the present disclosure, a PDCCH monitoring pattern is characterized by one or more of the following parameters for PDCCH: duration of a CORESET; PDCCH monitoring offset; PDCCH monitoring periodicity; and/or PDCCH monitoring pattern within a slot, e.g., a pattern indicated by monitoringSymbolsWithinSlot.

Throughout the present disclosure, different PDCCH monitoring patterns could be different from each other in one or more of the following parameters: duration of a CORESET; PDCCH monitoring offset; PDCCH monitoring periodicity; and/or PDCCH monitoring pattern within a slot, e.g., a pattern indicated by monitoringSymbolsWithinSlot.

Throughout the present disclosure, a first PDCCH monitoring pattern comprises a first CORESET duration, a first PDCCH monitoring offset, a first PDCCH monitoring periodicity and/or a first PDCCH monitoring pattern within a slot. A second PDCCH monitoring pattern comprises a second CORESET duration, a second PDCCH monitoring offset, a second PDCCH monitoring periodicity and/or a second PDCCH monitoring pattern within a slot.

Throughout the present disclosure, the PDCCH monitoring pattern could be for a search space, a subset of search spaces and/or all search spaces.

Throughout the present disclosure, the PDCCH monitoring pattern could be for a CORESET, a subset of CORESETs and/or all CORESETs.

Throughout the present disclosure, the PDCCH monitoring pattern could be for a search space type, e.g., UE-specific search space and/or common search space.

Throughout the present disclosure, the PDCCH monitoring pattern could be for a RNTI, a subset of RNTIs and/or all RNTIs.

Throughout the present disclosure, the PDCCH monitoring pattern could be for a DCI format, a subset of DCI formats and/or all DCI formats.

Throughout the present disclosure, a base station may determine PDCCH monitoring pattern for a UE in a same way that the UE determines the PDCCH monitoring pattern. For example, one or more of the methods and/or techniques described herein for determining PDCCH monitoring pattern for a UE are applicable to a base station (e.g., the base station may use one or more of the methods and/or techniques described herein to determine PDCCH monitoring pattern for a UE). A base station may determine PDCCH monitoring pattern for a UE using one or more of the methods and/or techniques presented herein. The base station may schedule the UE in accordance with the determined PDCCH monitoring pattern.

In a second embodiment of the present disclosure, a UE may monitor PDCCH with different (PDCCH monitoring) patterns when a timer is running and when the timer is not running. For example, a UE monitors PDCCH with a first pattern when a timer is running. The UE monitors PDCCH with a second pattern when the timer is not running. The UE monitors PDCCH with the second pattern when the timer expires (and/or when the timer is expired). The UE monitors PDCCH with the second pattern when the timer is suspended. The UE monitors PDCCH with the second pattern when the timer has not started.

Note that the above embodiments could be combined to form one or more other embodiments. In an example, when a first timer is running and a second timer is running, a UE monitors PDCCH with a first PDCCH monitoring pattern. When the first timer is running and the second timer is not running, the UE monitors PDCCH with a second PDCCH monitoring pattern. When the first timer is not running and the second timer is running, the UE monitors PDCCH with a third PDCCH monitoring pattern. When neither the first timer nor the second timer is running, the UE monitors PDCCH with a fourth PDCCH monitoring pattern.

In a third embodiment of the present disclosure, a UE may monitor PDCCH with different (PDCCH monitoring) patterns in active time based on an outcome of PDCCH decoding. In an example, a UE monitors PDCCH with a first pattern if the UE does not detect a PDCCH for the UE. The PDCCH may be a UE-specific PDCCH. The UE monitors PDCCH with a second pattern if the UE detects a PDCCH for the UE. The PDCCH may be a UE-specific PDCCH.

In an example, a UE monitors PDCCH with a first pattern during an on duration if the UE has not detected a PDCCH (and/or any PDCCH) for the UE in the on duration. The UE monitors PDCCH with a second pattern during an on duration if the UE detects a PDCCH for the UE in the on duration.

In an example, a UE monitors PDCCH with a first pattern if the UE has not detected a PDCCH (and/or any PDCCH) for the UE within last X slots. The UE monitors PDCCH with a second pattern if the UE detects a PDCCH for the UE within last X slots. A timer can be used to determine whether there is a PDCCH for the UE detected within last X slots. For example a timer can start and/or restart when a PDCCH for the UE is detected. The timer could be started upon being configured. The timer could be started at the beginning of an on duration. The timer could have a length of X slots (e.g., the timer may expire after a duration of X slots). When the timer expires, the UE could use the first PDCCH monitoring pattern. When the timer is running, the UE could use the second PDCCH monitoring pattern. X could be a fixed value. X could be a configured value. X could be an indicated value. X could be derived from a parameter. X could be derived from a length of another timer, e.g., a length of on duration timer.

In an example, a UE monitors PDCCH with a first pattern if a number of PDCCHs for the UE that the UE detected is less than and/or equal to Y. The UE monitors PDCCH with a second pattern if a number of PDCCHs for the UE that the UE detected is greater than and/or equal to Y. The number of PDCCHs could be a number of PDCCHs detected (by the UE) within a window. The number of PDCCHs could be a number of PDCCHs detected within last X slots. Y could be a fixed value. Y could be a configured value. Y could be an indicated value. Y could be derived from other parameter. Y could be derived from X. For example, Y could be a proportion and/or percentage of X (e.g., 50% of X and/or 30% of X).

In an example, a UE monitors PDCCH with a first pattern if a number of time occasions when PDCCH for the UE is detected is less than and/or equal to Y. The UE monitors PDCCH with a second pattern if a number of time occasions when PDCCH for the UE is greater than and/or equal to Y. The number of time occasions could be within a window. The number of time occasions could be within last X slots. The number of time occasions could be within last X time occasions. The time occasion could be a frame. The time occasion could be a slot. The time occasion could be an Orthogonal Frequency Division Multiplexing (OFDM) symbol. The time occasion could be one or more OFDM symbols. The time occasion could be a PDCCH monitoring occasion. The time occasion could be a time duration of a CORESET. The time occasion could be derived from a time duration of a CORESET. The time occasion could be an average among time durations of CORESETs.

In an example, a UE monitors PDCCH with a first pattern if a proportion of time occasions when PDCCH for the UE is detected is less than and/or equal to Y. The UE monitors PDCCH with a second pattern if a proportion of time occasions when PDCCH for the UE is detected is greater than and/or equal to Y. The proportion could be derived based on last X time occasions. For example, the UE detects PDCCH in 5 time occasions in (out of) last 10 time occasions (where X is equal to 10). In the example, the proportion of time occasions when PDCCH for the UE is detected would be 0.5 or 50%. If Y is set to 0.6 or 60%, the UE would monitor PDCCH with the first pattern (based on the proportion of time occasions being less than Y). If Y is set to 0.3 or 30%, the UE would monitor PDCCH with the second pattern (based on the proportion of time occasions being greater than Y). A length of X could be fixed. A length of X could be configurable. A length of X could be varying.

In one embodiment, a UE monitors PDCCH with a first pattern in active time when a first timer is running. The UE monitors PDCCH with a second pattern in active time when a second timer is running. The UE monitors PDCCH with a third pattern in active time wherein the active time is due to a first cause. The UE monitors PDCCH with a fourth pattern in active time wherein the active time is due to a second cause.

The first timer could be an on duration timer. The first timer could be an inactivity timer. The first timer could be a retransmission timer for DL. The first timer could be a retransmission timer for UL. The first timer could be a HARQ-RTT timer for DL. The first timer could be a HARQ-RTT timer for UL. The first timer could be a short cycle timer. The first timer could be a configured grant timer. The second timer could be an on duration timer. The second timer could be an inactivity timer. The second timer could be a retransmission timer for DL. The second timer could be a retransmission timer for UL. The second timer could be a HARQ-RTT timer for DL. The second timer could be a HARQ-RTT timer for UL. The second timer could be a short cycle timer. The second timer could be a configured grant timer.

The first cause may correspond to a Scheduling Request sent on PUCCH (and/or the Scheduling Request is pending). The first cause may correspond to the UE waiting for UL grant for newly arrival data. The first cause may correspond to the UE performing a random access procedure. The first cause may correspond to the UE performing part of a random access procedure. The first cause may correspond to a PDCCH indicating a new transmission addressed to the C-RNTI of the MAC entity not having been received after successful reception of a Random Access Response for the Random Access Preamble not selected by the MAC entity among the contention-based Random Access Preamble. The second cause may correspond to a Scheduling Request being sent on PUCCH (and/or the Scheduling Request is pending). The second cause may correspond to the UE waiting for UL grant for newly arrival data. The second cause may correspond to the UE performing a random access procedure. The second cause may correspond to the UE performing part of a random access procedure. The second cause may correspond to a PDCCH indicating a new transmission addressed to the C-RNTI of the MAC entity not having been received after successful reception of a Random Access Response for the Random Access Preamble not selected by the MAC entity among the contention-based Random Access Preamble.

The UE could determine the first pattern. The first pattern may be based on a first parameter related to PDCCH monitoring. The first pattern may be based on a first CORESET duration. The first pattern may be based on a first PDCCH monitoring periodicity. The first pattern may be based on a first PDCCH monitoring pattern within a slot. The UE could determine the second pattern. The second pattern may be based on a second parameter related to PDCCH monitoring. The second pattern may be based on a second CORESET duration. The second pattern may be based on a second PDCCH monitoring periodicity. The second pattern may be based on a second PDCCH monitoring pattern within a slot. The UE could determine the third pattern. The third pattern may be based on a third parameter related to PDCCH monitoring. The third pattern may be based on a third CORESET duration. The third pattern may be based on a third PDCCH monitoring periodicity. The third pattern may be based on a third PDCCH monitoring pattern within a slot. The UE could determine the fourth pattern. The fourth pattern may be based on a fourth parameter related to PDCCH monitoring. The fourth pattern may be based on a fourth CORESET duration. The fourth pattern may be based on a fourth PDCCH monitoring periodicity. The fourth pattern may be based on a fourth PDCCH monitoring pattern within a slot. The UE could associate a parameter for PDCCH monitoring with a timer. The association of the parameter for PDCCH monitoring with the timer could be based on network configuration. The UE could associate a parameter for PDCCH monitoring with a cause. The association of the parameter for PDCCH monitoring with the cause could be based on network configuration.

Different parameters for different timers/causes could be separately configured. Different parameters for different timers/causes could be derived from a configuration. A base station could configure a parameter for PDCCH monitoring which is applicable for one or more first timer(s) and/or one or more first cause(s). The base station may determine a PDCCH monitoring pattern for a UE in a similar manner that the UE determines the PDCCH monitoring pattern. For example, the base station may determine the PDCCH monitoring pattern for the UE using one or more of the preceding techniques described with respect to UE operation (e.g., the base station may determine the PDCCH monitoring pattern based upon one or more timers that are running and/or based upon one or more cause(s) of active time). The parameter for PDCCH monitoring may not be applicable for one or more second timer(s) (different than the one or more first timer(s)) and/or one or more second cause(s) (different than the one or more first cause(s)).

Figure 7:
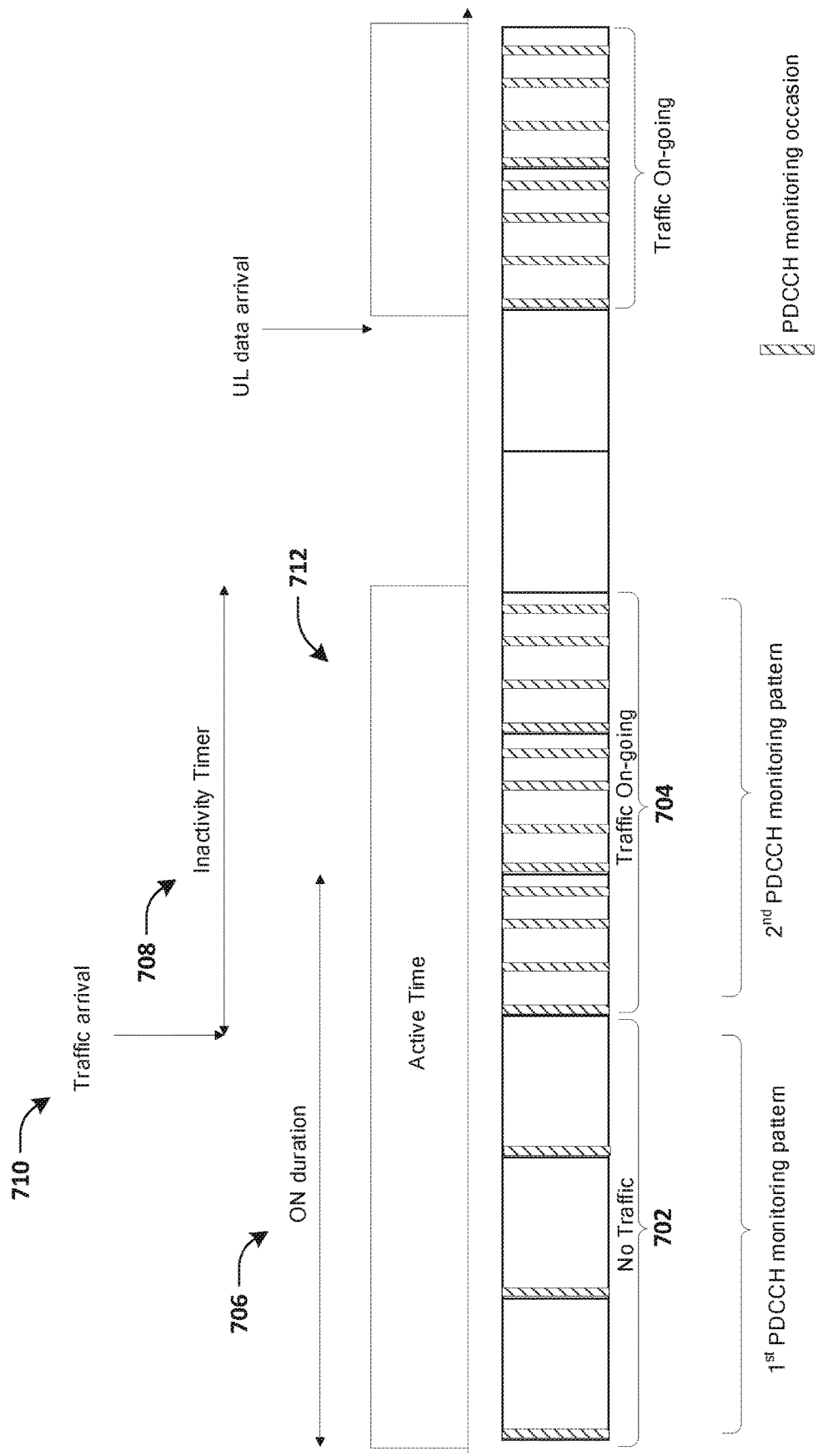
FIG. 7 illustrates application of a first PDCCH monitoring pattern and a second PDCCH monitoring pattern.

An example of this embodiment is presented in FIG. 7. FIG. 7 illustrates application of a first PDCCH monitoring pattern and a second PDCCH monitoring pattern. In FIG. 7, the first PDCCH monitoring pattern is used for a first period 702 during which an on duration timer 706 is running and/or an inactivity timer 708 is not running. Alternatively and/or additionally, the second PDCCH monitoring pattern is used for a second period 704 during which the inactivity timer 708 is running. The first period 702 and/or the second period 704 may be during active time 712. The inactivity timer 708 may be triggered responsive to a traffic arrival 710 (e.g., reception of data). Data traffic during the first period 702 (e.g., transmission and/or reception of data during the first period 702) may be less than a threshold amount of data traffic (and/or no data traffic) and/or data traffic during the second period 704 may be greater than the threshold amount of data traffic (and/or the second period 704 may have an ongoing data burst). A first frequency of monitoring occasions of the first PDCCH monitoring pattern may be suitable and/or efficient for the first period 702. A second frequency of monitoring occasions of the second PDCCH monitoring pattern may be suitable and/or efficient for the second period 704. Alternatively and/or additionally, the second frequency of monitoring occasions of the second PDCCH monitoring pattern may be greater than the first frequency of monitoring occasions of the first PDCCH monitoring pattern. Alternatively and/or additionally, the second PDCCH monitoring pattern may be used after UL data arrives (at "UL data arrival" in FIG. 7).

In another embodiment, a UE monitors PDCCH with a first pattern in active time when a first timer is running. The UE could monitor PDCCH with a second pattern in active time when the first timer is not running. Alternatively and/or additionally, the UE could monitor PDCCH with the second pattern in active time when the first timer expires. Alternatively and/or additionally, the UE could monitor PDCCH with the second pattern in active time when the first timer is suspended. Alternatively and/or additionally, the UE could monitor PDCCH with the second pattern in active time when the first timer has not started.

The first timer could be an on duration timer. The first timer could be an inactivity timer. The first timer could be a retransmission timer for DL. The first timer could be a retransmission timer for UL. The first timer could be a HARQ-RTT timer for DL. The first timer could be a HARQ-RTT timer for UL. The first timer could be a short cycle timer. The first timer could be a configured grant timer. The UE could determine the first pattern. The first pattern is based on a first parameter related to PDCCH monitoring. The first pattern may be based on a first CORESET duration. The first pattern may be based on a first PDCCH monitoring periodicity. The first pattern may be based on a first PDCCH monitoring pattern within a slot. The UE could determine the second pattern. The second pattern may be based on a second parameter related to PDCCH monitoring. The second pattern may be based on a second CORESET duration. The second pattern may be based on a second PDCCH monitoring periodicity. The second pattern may be based on a second PDCCH monitoring pattern within a slot. The UE could associate a parameter for PDCCH monitoring with a timer. The association of the parameter for PDCCH monitoring with the timer could be based on network configuration. The UE could associate a parameter for PDCCH monitoring with a cause. The association of the parameter for PDCCH monitoring with the cause could be based on network configuration.

Different parameters for different timers/causes could be separately configured. Different parameters for different timers/causes could be derived from a configuration. A base station could configure a parameter for PDCCH monitoring which is applicable for one or more first timer(s) and/or one or more first cause(s). The base station may determine a PDCCH monitoring pattern for a UE in a similar manner that the UE determines the PDCCH monitoring pattern. For example, the base station may determine the PDCCH monitoring pattern for the UE using one or more of the preceding techniques described with respect to UE operation (e.g., the base station may determine the PDCCH monitoring pattern based upon whether a timer is running and/or based upon one or more cause(s) of active time). The parameter for PDCCH monitoring may not be applicable for one or more second timer(s) (different than the one or more first timer(s)) and/or one or more second cause(s) (different than the one or more first cause(s)).

In another embodiment, a UE receives configuration of a first parameter related to PDCCH monitoring pattern (for a search space set) and a second parameter related to PDCCH monitoring pattern (for the search space set). A parameter of the two parameters is used in a period of time and the other parameter is not used in the period of time. The first parameter could be a duration of CORESET. The first parameter could be a PDCCH monitoring offset. The first parameter could be a PDCCH monitoring periodicity. The first parameter could be a PDCCH monitoring pattern within a slot. The second parameter could be a duration of CORESET. The second parameter could be a PDCCH monitoring offset. The second parameter could be a PDCCH monitoring periodicity. The second parameter could be a PDCCH monitoring pattern within a slot.

The UE could determine which of the first parameter or the second parameter is used to determine a PDCCH monitoring pattern (for the search space set) (in a time occasion) based on an outcome of PDCCH monitoring/decoding (e.g., PDCCH monitoring/decoding in a previous time occasion(s)).

The UE could determine which of the first parameter or the second parameter is used to determine a PDCCH monitoring pattern (for the search space set) (in a time occasion) based on whether the UE detects PDCCH for itself in a previous time occasion(s) or not. For example, the UE determines the first parameter is used (for the DRX cycle) if the UE detected PDCCH for itself in the previous time occasion. Alternatively and/or additionally, the UE determines the second parameter is used (for the DRX cycle) if the UE did not detect PDCCH for itself in the previous time occasion.

The UE could determine which of the first parameter or the second parameter is used to determine a PDCCH monitoring pattern (for the search space set) in a DRX cycle based on whether the UE has detected PDCCH for itself in the DRX cycle or not. For example, the UE determines the first parameter is used (for the DRX cycle) if the UE has detected PDCCH for itself in the DRX cycle. Alternatively and/or additionally, the UE determines the second parameter is used (for the DRX cycle) if the UE has not yet detected PDCCH for itself in the DRX cycle.

The UE could determine which of the first parameter or the second parameter is used to determine a PDCCH monitoring pattern (for the search space set) in a DRX cycle based on whether the UE detected PDCCH for itself in a previous DRX cycle or not. For example, the UE determines the first parameter is used (for the DRX cycle) if the UE detected PDCCH for itself in the previous DRX cycle. Alternatively and/or additionally, the UE determines the second parameter is used (for the DRX cycle) if the UE did not detect PDCCH for itself in the previous DRX cycle.

The UE could determine which of the first parameter or the second parameter is used to determine a PDCCH monitoring pattern (for the search space set) in an on duration based on whether the UE has detected PDCCH for itself in the on duration or not. For example, the UE determines the first parameter is used (for the on duration) if the UE has detected PDCCH for itself in the on duration. Alternatively and/or additionally, the UE determines the second parameter is used (for the on duration) if the UE has not yet detected PDCCH for itself in the on duration.

The UE could determine which of the first parameter or the second parameter is used to determine a PDCCH monitoring pattern (for the search space set) in an on duration based on whether the UE has detected PDCCH for itself in a previous DRX cycle or not. For example, the UE determines the first parameter is used (for the on duration) if the UE detected PDCCH for itself in the previous DRX cycle. Alternatively and/or additionally, the UE determines the second parameter is used (for the on duration) if the UE did not detect PDCCH for itself in the previous DRX cycle.

The UE could determine which of the first parameter or the second parameter is used to determine a PDCCH monitoring pattern (for the search space set) in an on duration based on whether the UE has detected PDCCH for itself in a previous on duration or not. For example, the UE determines the first parameter is used (for the on duration) if the UE detected PDCCH for itself in the previous on duration. Alternatively and/or additionally, the UE determines the second parameter is used (for the on duration) if the UE did not detect PDCCH for itself in the previous on duration.

The UE could determine which of the first parameter or the second parameter is used to determine a PDCCH monitoring pattern (for the search space set) (in a time occasion) based on a number of PDCCHs detected for the UE in a previous time occasion(s). For example, the UE determines the first parameter is used (for the DRX cycle) if the number of PDCCHs detected for the UE is greater than and/or equal to a value. Alternatively and/or additionally, the UE determines the second parameter is used (for the DRX cycle) if the number of PDCCHs detected for the UE is less than and/or equal to a value.

The UE could determine which of the first parameter or the second parameter is used to determine a PDCCH monitoring pattern (for the search space set) (in a time occasion) based on a number of time occasion(s) when PDCCH for the UE is detected in previous time occasions. For example, the UE determines the first parameter is used (for the DRX cycle) if the number of time occasion(s) when PDCCH for the UE is detected is greater than and/or equal to a value. Alternatively and/or additionally, the UE determines the second parameter is used (for the DRX cycle) if the number of time occasion(s) when PDCCH for the UE is detected is less than and/or equal to a value.

The UE could determine which of the first parameter or the second parameter is used to determine a PDCCH monitoring pattern (for the search space set) (in a time occasion) based on a proportion of time occasion(s) when PDCCH for the UE is detected in previous time occasions. For example, the UE determines the first parameter is used (for the DRX cycle) if the proportion of time occasion(s) when PDCCH for the UE is detected is greater than or equal to a value. Alternatively and/or additionally, the UE determines the second parameter is used (for the DRX cycle) if the proportion of time occasion(s) when PDCCH for the UE is detected is less than and/or equal to a value.

In some examples, a determination of which parameter (of a plurality of parameters) is used could be performed in a current time occasion. Alternatively and/or additionally, the determination of which parameter is used could be performed in a current slot. Alternatively and/or additionally, the determination of which parameter is used could be performed in a current PDCCH monitoring occasion. Alternatively and/or additionally, determinations of which parameter is used could be performed periodically.

In some examples, the determination (and/or an outcome of the determination, such as a parameter of the plurality of parameters) is applied/applicable to a current time occasion. Alternatively and/or additionally, the determination (and/or the outcome of the determination) is applied/applicable to a current slot. Alternatively and/or additionally, the determination (and/or the outcome of the determination) is applied/applicable to a current PDCCH monitoring occasion. Alternatively and/or additionally, the determination (and/or the outcome of the determination) is applied/applicable to a next time occasion. Alternatively and/or additionally, the determination (and/or the outcome of the determination) is applied/applicable to a next slot. Alternatively and/or additionally, the determination (and/or the outcome of the determination) is applied/applicable to a next PDCCH monitoring occasion(s). Alternatively and/or additionally, the determination (and/or the outcome of the determination) is applied/applicable to a following time occasion (after the current time occasion). Alternatively and/or additionally, the determination (and/or the outcome of the determination) is applied/applicable to a following slot (after the current slot). Alternatively and/or additionally, the determination (and/or the outcome of the determination) is applied/applicable to a following PDCCH monitoring occasion (after the current PDCCH monitoring occasion). Alternatively and/or additionally, the determination (and/or the outcome of the determination) is applied/applicable after a period of time (after the determination is performed). Alternatively and/or additionally, the determination (and/or the outcome of the determination) is applied/applicable for a second period of time. In some examples, the period of time and/or the second period of time are fixed. Alternatively and/or additionally, the period of time and/or the second period of time are configured. Alternatively and/or additionally, the determination (and/or the outcome of the determination) is applied/applicable until a next determination (e.g., the determination and/or the outcome of the determination is applied/applicable until the next determination is performed). Alternatively and/or additionally, the determination (and/or the outcome of the determination) is applied/applicable until an indication from a base station is received. Alternatively and/or additionally, the determination (and/or the outcome of the determination) is applied/applicable until a timer expires.

In some examples, a previous time occasion(s), as used herein, comprises a fixed number of time occasions. Alternatively and/or additionally, a previous time occasion(s) comprises a configurable number of time occasion(s). Alternatively and/or additionally, a previous time occasion(s) corresponds to time occasion(s) preceding and/or directly before a current time occasion. Alternatively and/or additionally, a previous time occasion(s) corresponds to time occasion(s) at least a number of slot(s) before a current time occasion. Alternatively and/or additionally, a previous time occasion(s) corresponds to time occasion(s) at least a number of time occasion(s) before a current time occasion. Alternatively and/or additionally, a previous time occasion(s) corresponds to time occasion(s) at least a number of symbol(s) before a current time occasion. Alternatively and/or additionally, a previous time occasion(s) corresponds to time occasion(s) within a period of time. In some examples, the period of time has a configurable length. Alternatively and/or additionally, the period of time has a fixed length. In some examples, a previous time occasion(s) corresponds to time occasion(s) within a time window. In some examples, the time window has a fixed length. Alternatively and/or additionally, the time window has a configurable length. Alternatively and/or additionally, the time window is controlled by a timer.

A time occasion could be a slot. A time occasion could be a PDCCH monitoring occasion. A time occasion could be a transmission time interval (TTI). A time occasion could be an OFDM symbol. A time occasion could comprise OFDM symbols. A time occasion could be a time duration of a CORESET.

A PDCCH for the UE could be a PDCCH (and/or any PDCCH) the UE received. A PDCCH for the UE could be a PDCCH specifically for the UE. A PDCCH for the UE could be associated with a RNTI(s). A PDCCH for the UE could be addressed to a RNTI(s). A PDCCH for the UE could be cyclic redundancy check (CRC)-scrambled with a RNTI(s). In some examples, the RNTI(s) is configured for the UE. Alternatively and/or additionally, the RNTI(s) comprises C-RNTI. Alternatively and/or additionally, the RNTI(s) comprises configured scheduling-RNTI (CS-RNTI). Alternatively and/or additionally, the RNTI(s) comprises Modulation Code Scheme-C-RNTI (MCS-C-RNTI). Alternatively and/or additionally, the RNTI(s) comprises Semi-persistent (SP) Channel State Information (CSI) RNTI (SP-CSI-RNTI). Alternatively and/or additionally, the RNTI(s) comprises Transmit Power Control (TPC) Physical Uplink Shared Channel (PUSCH) RNTI (TPC-PUSCH-RNTI). Alternatively and/or additionally, the RNTI(s) comprises TPC-PUCCH-RNTI. Alternatively and/or additionally, the RNTI(s) comprises TPC-Sounding Reference Signal (SRS)-RNTI (TPC-SRS-RNTI). Alternatively and/or additionally, the RNTI(s) comprises Temporary C-RNTI (TC-RNTI). Alternatively and/or additionally, the RNTI(s) comprises Slot Format Indication (SFI-RNTI). Alternatively and/or additionally, the RNTI(s) comprises Interruption RNTI (INT-RNTI). In some examples, a PDCCH for the UE schedules data transmission to the UE. In some examples, the data transmission is for DL data. In some examples, the data transmission is an UL data.

In some examples, a value, as used herein, could be a fixed value. Alternatively and/or additionally, a value could be a configurable value. Alternatively and/or additionally, a value could be a varying value. Alternatively and/or additionally, a value is received from a base station, e.g., via configuration. In some examples, a value is negotiated between the UE and a base station. In some examples, the UE recommends (and/or transmits) the value to a base station.

Throughout the present disclosure, PDCCH could be replaced with downlink control information (DCI). It may be appreciated that one or more of the techniques and/or methods presented herein related to PDCCH may (also) be related to and/or applied for DCI.

Figure 8:
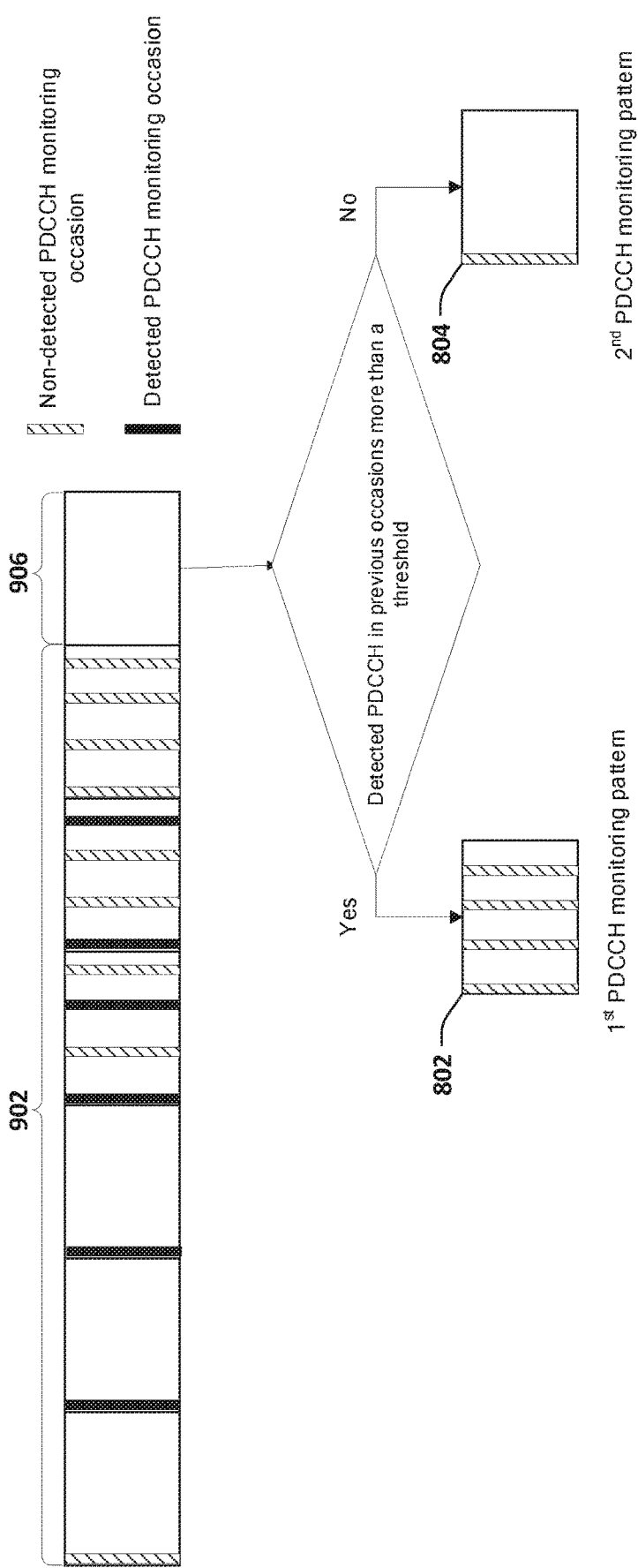
FIG. 8 illustrates a determination of which of a first PDCCH monitoring pattern or a second PDCCH monitoring pattern to use in one or more time occasions.
Figure 9:
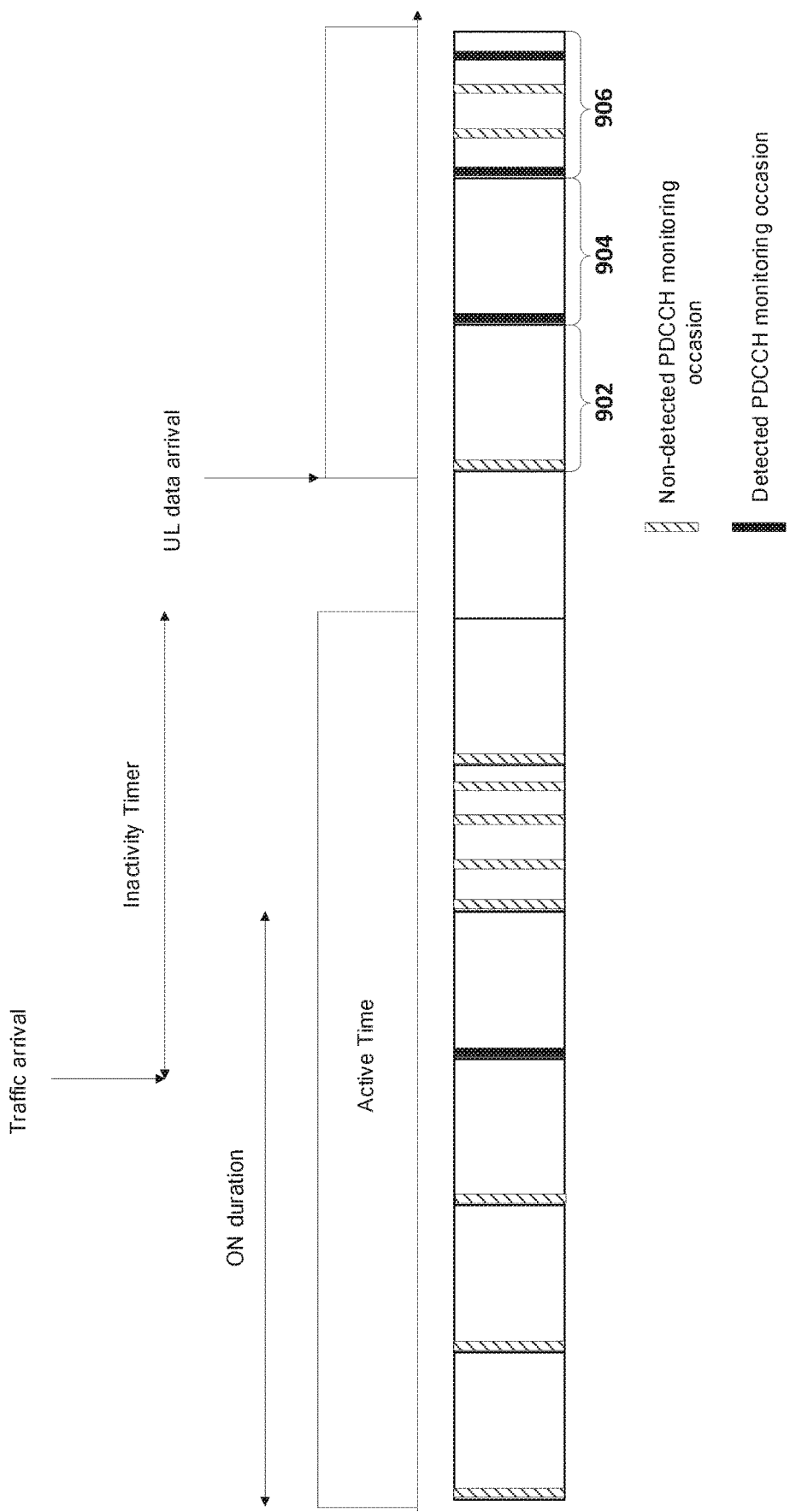
FIG. 9 illustrates determination and/or application of a PDCCH monitoring pattern.

An illustration of this embodiment is presented in FIGS. 8-9. FIG. 8 illustrates a determination of which of a first PDCCH monitoring pattern 802 or a second PDCCH monitoring pattern 804 to use in one or more time occasions 906. For example, which of the first PDCCH monitoring pattern 802 or the second PDCCH monitoring pattern 804 to use in the one or more time occasions 906 may be determined based upon previous time occasions 902. Alternatively and/or additionally, which of the first PDCCH monitoring pattern 802 or the second PDCCH monitoring pattern 804 to use in the one or more time occasions 906 may be determined based upon one or more previous time occasions of the previous time occasions 902. For example, it may be determined (by a UE) to use the first PDCCH monitoring pattern 802 in the one or more time occasions 906 responsive to determining that a number of PDCCHs detected (for the UE) in the one or more previous time occasions is greater than and/or equal to a threshold value (e.g., the UE may select the first PDCCH monitoring pattern 802 for application in the one or more time occasions 906 responsive to determining that the number of PDCCHs detected for the UE in the one or more previous time occasions is greater than and/or equal to the threshold value). Alternatively and/or additionally, it may be determined (by the UE) to use the second PDCCH monitoring pattern 804 in the one or more time occasions 906 responsive to determining that the number of PDCCHs detected (for the UE) in the one or more previous time occasions is less than and/or equal to the threshold value (e.g., the UE may select the second PDCCH monitoring pattern 804 for application in the one or more time occasions 906 responsive to determining that the number of PDCCHs detected for the UE in the one or more previous time occasions is less than and/or equal to the threshold value).

FIG. 9 illustrates determination and/or application of a PDCCH monitoring pattern. For example, it may be determined (by the UE) to apply the second PDCCH monitoring pattern 804 to a second time occasion 904 responsive to determining that a number of PDCCHs detected (for the UE) in a first time occasion 902 (e.g., the first time occasion 902 may correspond to a previous time occasion with respect to the second time occasion 904) is less than and/or equal to the threshold value (e.g., the UE may select the second PDCCH monitoring pattern 804 for application in the second time occasion 904 responsive to determining that the number of PDCCHs detected for the UE in the first time occasion 902 is less than and/or equal to the threshold value). Alternatively and/or additionally, it may be determined (by the UE) to apply the first PDCCH monitoring pattern 802 to a third time occasion 906 responsive to determining that a number of PDCCHs detected for the UE in the second time occasion 904 (e.g., the second time occasion 904 may correspond to a previous time occasion with respect to the third time occasion 906) is greater than and/or equal to the threshold value (e.g., the UE may select the first PDCCH monitoring pattern 802 for application in the third time occasion 906 responsive to determining that the number of PDCCHs detected for the UE in the second time occasion 904 is greater than and/or equal to the threshold value).

In another embodiment, a UE receives a configuration of a first value of a parameter related to PDCCH monitoring pattern (for a search space set) and a second value of the parameter related to PDCCH monitoring pattern (for the search space set). A value of the two values is used for the parameter in a period of time and the other value is not used for the parameter in the period of time (e.g., the parameter may based on a value of the two values in the period of time and/or the parameter may not be based on the other value in the period of time). The parameter could be a duration of CORESET. The parameter could be a PDCCH monitoring offset. The parameter could be a PDCCH monitoring periodicity. The parameter could be a PDCCH monitoring pattern within a slot.

The UE could determine which of the first value or the second value is used for the parameter (to determine a PDCCH monitoring pattern) (for the search space set) (in a time occasion) based on an outcome of PDCCH monitoring/decoding (e.g., PDCCH monitoring/decoding in a previous time occasion(s)).

The UE could determine which of the first value or the second value is used for the parameter (to determine a PDCCH monitoring pattern) (for the search space set) (in a time occasion) based on whether the UE detects PDCCH for itself in a previous time occasion(s) or not. For example, the UE determines the first value is used (for the DRX cycle) if the UE detected PDCCH for itself in the previous time occasion. Alternatively and/or additionally, the UE determines the second value is used (for the DRX cycle) if the UE did not detect PDCCH for itself in the previous time occasion.

The UE could determine which of the first value or the second value is used for the parameter (to determine a PDCCH monitoring pattern) (for the search space set) in a DRX cycle based on whether the UE has detected PDCCH for itself in the DRX cycle or not. For example, the UE determines the first value is used (for the DRX cycle) if the UE has detected PDCCH for itself in the DRX cycle. Alternatively and/or additionally, the UE determines the second value is used (for the DRX cycle) if the UE has not yet detected PDCCH for itself in the DRX cycle.

The UE could determine which of the first value or the second value is used for the parameter (to determine a PDCCH monitoring pattern) (for the search space set) in a DRX cycle based on whether the UE detected PDCCH for itself in a previous DRX cycle or not. For example, the UE determines the first value is used (for the DRX cycle) if the UE detected PDCCH for itself in the previous DRX cycle. Alternatively and/or additionally, the UE determines the second value is used (for the DRX cycle) if the UE did not detect PDCCH for itself in the previous DRX cycle.

The UE could determine which of the first value or the second value is used for the parameter (to determine a PDCCH monitoring pattern) (for the search space set) in an on duration based on whether the UE has detected PDCCH for itself in the on duration or not. For example, the UE determines the first value is used (for the on duration) if the UE has detected PDCCH for itself in the on duration. Alternatively and/or additionally, the UE determines the second value is used (for the on duration) if the UE has not yet detected PDCCH for itself in the on duration.

The UE could determine which of the first value or the second value is used for the parameter (to determine a PDCCH monitoring pattern) (for the search space set) in an on duration based on whether the UE has detected PDCCH for itself in a previous DRX cycle or not. For example, the UE determines the first value is used (for the on duration) if the UE detected PDCCH for itself in the previous DRX cycle. Alternatively and/or additionally, the UE determines the second value is used (for the on duration) if the UE did not detect PDCCH for itself in the previous DRX cycle.

The UE could determine which of the first value or the second value is used for the parameter (to determine a PDCCH monitoring pattern) (for the search space set) in an on duration based on whether the UE has detected PDCCH for itself in a previous on duration or not. For example, the UE determines the first value is used (for the on duration) if the UE detected PDCCH for itself in the previous on duration. Alternatively and/or additionally, the UE determines the second value is used (for the on duration) if the UE did not detect PDCCH for itself in the previous on duration.

The UE could determine which of the first value or the second value is used for the parameter (to determine a PDCCH monitoring pattern) (for the search space set) (in a time occasion) based on a number of PDCCHs detected for the UE in a previous time occasion(s). For example, the UE determines the first value is used (for the DRX cycle) if the number of PDCCHs detected for the UE is greater than and/or equal to a third value. Alternatively and/or additionally, the UE determines the second value is used (for the DRX cycle) if the number of PDCCHs detected for the UE is less than and/or equal to the third value.

The UE could determine which of the first value or the second value is used for the parameter (to determine a PDCCH monitoring pattern) (for the search space set) (in a time occasion) based on a number of time occasion(s) when PDCCH for the UE is detected in previous time occasions. For example, the UE determines the first value is used (for the DRX cycle) if the number of time occasion(s) when PDCCH for the UE is detected is greater than and/or equal to a third value. Alternatively and/or additionally, the UE determines the second value is used (for the DRX cycle) if the number of time occasion(s) when PDCCH for the UE is detected is less than and/or equal to the third value.

The UE could determine which of the first value or the second value is used for the parameter (to determine a PDCCH monitoring pattern) (for the search space set) (in a time occasion) based on a proportion of time occasion(s) when PDCCH for the UE is detected in previous time occasions. For example, the UE determines the first value is used (for the DRX cycle) if the proportion of time occasion(s) when PDCCH for the UE is detected is greater than and/or equal to a third value. Alternatively and/or additionally, the UE determines the second value is used (for the DRX cycle) if the proportion of time occasion(s) when PDCCH for the UE is detected is less than and/or equal to the third value.

In some examples, a determination of which value (of a plurality of values) is used could be performed in a current time occasion. Alternatively and/or additionally, the determination of which value is used could be performed in a current slot. Alternatively and/or additionally, the determination of which value is used could be performed in a current PDCCH monitoring occasion. Alternatively and/or additionally, determinations of which value is used could be performed periodically.

In some examples, the determination (and/or an outcome of the determination, such as a value of the plurality of values) is applied/applicable to a current time occasion. Alternatively and/or additionally, the determination (and/or the outcome of the determination) is applied/applicable to a current slot. Alternatively and/or additionally, the determination (and/or the outcome of the determination) is applied/applicable to a current PDCCH monitoring occasion. Alternatively and/or additionally, the determination (and/or the outcome of the determination) is applied/applicable to a next time occasion. Alternatively and/or additionally, the determination (and/or the outcome of the determination) is applied/applicable to a next slot. Alternatively and/or additionally, the determination (and/or the outcome of the determination) is applied/applicable to a next PDCCH monitoring occasion(s). Alternatively and/or additionally, the determination (and/or the outcome of the determination) is applied/applicable to a following time occasion (after the current time occasion). Alternatively and/or additionally, the determination (and/or the outcome of the determination) is applied/applicable to a following slot (after the current slot). Alternatively and/or additionally, the determination (and/or the outcome of the determination) is applied/applicable to a following PDCCH monitoring occasion (after the current PDCCH monitoring occasion). Alternatively and/or additionally, the determination (and/or the outcome of the determination) is applied/applicable after a period of time (after the determination is performed). Alternatively and/or additionally, the determination (and/or the outcome of the determination) is applied/applicable for a second period of time. In some examples, the period of time and/or the second period of time are fixed. Alternatively and/or additionally, the period of time and/or the second period of time are configured. Alternatively and/or additionally, the determination (and/or the outcome of the determination) is applied/applicable until a next determination (e.g., the determination and/or the outcome of the determination is applied/applicable until the next determination is performed). Alternatively and/or additionally, the determination (and/or the outcome of the determination) is applied/applicable until an indication from a base station is received. Alternatively and/or additionally, the determination (and/or the outcome of the determination) is applied/applicable until a timer expires.

In some examples, a previous time occasion(s), as used herein, comprises a fixed number of time occasions. Alternatively and/or additionally, a previous time occasion(s) comprises a configurable number of time occasion(s). Alternatively and/or additionally, a previous time occasion(s) corresponds to time occasion(s) preceding and/or directly before a current time occasion. Alternatively and/or additionally, a previous time occasion(s) corresponds to time occasion(s) at least a number of slot(s) before a current time occasion. Alternatively and/or additionally, a previous time occasion(s) corresponds to time occasion(s) at least a number of time occasion(s) before a current time occasion. Alternatively and/or additionally, a previous time occasion(s) corresponds to time occasion(s) at least a number of symbol(s) before a current time occasion. Alternatively and/or additionally, a previous time occasion(s) corresponds to time occasion(s) within a period of time. In some examples, the period of time has a configurable length. Alternatively and/or additionally, the period of time has a fixed length. In some examples, a previous time occasion(s) corresponds to time occasion(s) within a time window. In some examples, the time window has a fixed length. Alternatively and/or additionally, the time window has a configurable length. Alternatively and/or additionally, the time window is controlled by a timer.

A time occasion could be a slot. A time occasion could be a PDCCH monitoring occasion. A time occasion could be a TTI. A time occasion could be an OFDM symbol. A time occasion could comprise OFDM symbols. A time occasion could be a time duration of a CORESET.

A PDCCH for the UE could be a PDCCH (and/or any) the UE received. A PDCCH for the UE could be a PDCCH specifically for the UE. A PDCCH for the UE could be associated with a RNTI(s). A PDCCH for the UE could be addressed to a RNTI(s). A PDCCH for the UE could be CRC-scrambled with a RNTI(s). In some examples, the RNTI(s) is configured for the UE. Alternatively and/or additionally, the RNTI(s) comprises C-RNTI. Alternatively and/or additionally, the RNTI(s) comprises CS-RNTI. Alternatively and/or additionally, the RNTI(s) comprises MCS-C-RNTI. Alternatively and/or additionally, the RNTI(s) comprises SP-CSI-RNTI. Alternatively and/or additionally, the RNTI(s) comprises TPC-PUSCH-RNTI. Alternatively and/or additionally, the RNTI(s) comprises TPC-PUCCH-RNTI. Alternatively and/or additionally, the RNTI(s) comprises TPC-SRS-RNTI. Alternatively and/or additionally, the RNTI(s) comprises TC-RNTI. Alternatively and/or additionally, the RNTI(s) comprises SFI-RNTI. Alternatively and/or additionally, the RNTI(s) comprises INT-RNTI. In some examples, a PDCCH for the UE schedules data transmission to the UE. In some examples, the data transmission is for DL data. In some examples, the data transmission is an UL data.

In some examples, a value, such as the third value, could be a fixed value. Alternatively and/or additionally, a value, such as the third value, could be a configurable value. Alternatively and/or additionally, a value, such as the third value, could be a varying value. Alternatively and/or additionally, a value, such as the third value, is received from a base station, e.g., via configuration. In some examples, a value, such as the third value, is negotiated between the UE and a base station. In some examples, the UE recommends (and/or transmits) a value, such as the third value, to a base station.

In another embodiment, a UE receives a first configuration related to PDCCH monitoring pattern (for a search space set) and a second configuration related to PDCCH monitoring pattern (for the search space set). A configuration of the two configurations is used in a period of time and the other configuration is not used in the period of time. The first configuration could be a duration of CORESET. The first configuration could be a PDCCH monitoring offset. The first configuration could be a PDCCH monitoring periodicity. The first configuration could be a PDCCH monitoring pattern within a slot. The second configuration could be a duration of CORESET. The second configuration could be a PDCCH monitoring offset. The second configuration could be a PDCCH monitoring periodicity. The second configuration could be a PDCCH monitoring pattern within a slot.

The UE could determine which of the first configuration or the second configuration is used (to determine a PDCCH monitoring pattern) (for the search space set) (in a time occasion) based on an outcome of PDCCH monitoring/decoding (e.g., PDCCH monitoring/decoding in a previous time occasion(s)).

The UE could determine which of the first configuration or the second configuration is used (to determine a PDCCH monitoring pattern) (for the search space set) (in a time occasion) based on whether the UE detected PDCCH for itself in a previous time occasion(s) or not. For example, the UE determines the first configuration is used (for the DRX cycle) if the UE detected PDCCH for itself in the previous time occasion. Alternatively and/or additionally, the UE determines the second configuration is used (for the DRX cycle) if the UE did not detect PDCCH for itself in the previous time occasion.

The UE could determine which of the first configuration or the second configuration is used (to determine a PDCCH monitoring pattern) (for the search space set) in a DRX cycle based on whether the UE has detected PDCCH for itself in the DRX cycle or not. For example, the UE determines the first configuration is used (for the DRX cycle) if the UE has detected PDCCH for itself in the DRX cycle. Alternatively and/or additionally, the UE determines the second configuration is used (for the DRX cycle) if the UE has not yet detected PDCCH for itself in the DRX cycle.

The UE could determine which of the first configuration or the second configuration is used (to determine a PDCCH monitoring pattern) (for the search space set) in a DRX cycle based on whether the UE detected PDCCH for itself in a previous DRX cycle or not. For example, the UE determines the first configuration is used (for the DRX cycle) if the UE detected PDCCH for itself in the previous DRX cycle. Alternatively and/or additionally, the UE determines the second configuration is used (for the DRX cycle) if the UE did not detect PDCCH for itself in the previous DRX cycle.

The UE could determine which of the first configuration or the second configuration is used (to determine a PDCCH monitoring pattern) (for the search space set) in an on duration based on whether the UE has detected PDCCH for itself in the on duration or not. For example, the UE determines the first configuration is used (for the on duration) if the UE has detected PDCCH for itself in the on duration. Alternatively and/or additionally, the UE determines the second configuration is used (for the on duration) if the UE has not yet detected PDCCH for itself in the on duration.

The UE could determine which of the first configuration or the second configuration is used (to determine a PDCCH monitoring pattern) (for the search space set) in an on duration based on whether the UE has detected PDCCH for itself in a previous DRX cycle or not. For example, the UE determines the first configuration is used (for the on duration) if the UE detected PDCCH for itself in the previous DRX cycle. Alternatively and/or additionally, the UE determines the second configuration is used (for the on duration) if the UE did not detect PDCCH for itself in the previous DRX cycle.

The UE could determine which of the first configuration or the second configuration is used (to determine a PDCCH monitoring pattern) (for the search space set) in an on duration based on whether the UE has detected PDCCH for itself in a previous on duration or not. For example, the UE determines the first configuration is used (for the on duration) if the UE detected PDCCH for itself in the previous on duration. Alternatively and/or additionally, the UE determines the second configuration is used (for the on duration) if the UE did not detect PDCCH for itself in the previous on duration.

The UE could determine which of the first configuration or the second configuration is used (to determine a PDCCH monitoring pattern) (for the search space set) (in a time occasion) based on a number of PDCCHs detected for the UE in a previous time occasion(s). For example, the UE determines the first configuration is used (for the DRX cycle) if the number of PDCCHs detected for the UE is greater than and/or equal to a value. Alternatively and/or additionally, the UE determines the second configuration is used (for the DRX cycle) if the number of PDCCHs detected for the UE is less than and/or equal to a value.

The UE could determine which of the first configuration or the second configuration is used (to determine a PDCCH monitoring pattern) (for the search space set) (in a time occasion) based on a number of time occasion(s) when PDCCH for the UE is detected in previous time occasions. For example, the UE determines the first configuration is used (for the DRX cycle) if the number of time occasion(s) when PDCCH for the UE is detected is greater than and/or equal to a value. Alternatively and/or additionally, the UE determines the second configuration is used (for the DRX cycle) if the number of time occasion(s) when PDCCH for the UE is detected is less than and/or equal to a value.

The UE could determine which of the first configuration or the second configuration is used (to determine a PDCCH monitoring pattern) (for the search space set) (in a time occasion) based on a proportion of time occasion(s) when PDCCH for the UE is detected in previous time occasions. For example, the UE determines the first configuration is used (for the DRX cycle) if the proportion of time occasion(s) when PDCCH for the UE is detected is greater than and/or equal to a value. Alternatively and/or additionally, the UE determines the second configuration is used (for the DRX cycle) if the proportion of time occasion(s) when PDCCH for the UE is detected is less than and/or equal to a value.

In some examples, a determination of which configuration (of a plurality of configurations) is used could be performed in a current time occasion. Alternatively and/or additionally, the determination of which configuration is used could be performed in a current slot. Alternatively and/or additionally, the determination of which configuration is used could be performed in a current PDCCH monitoring occasion. Alternatively and/or additionally, determinations of which configuration is used could be performed periodically.

In some examples, the determination (and/or an outcome of the determination, such as a parameter of the plurality of parameters) is applied/applicable to a current time occasion. Alternatively and/or additionally, the determination (and/or the outcome of the determination) is applied/applicable to a current slot. Alternatively and/or additionally, the determination (and/or the outcome of the determination) is applied/applicable to a current PDCCH monitoring occasion. Alternatively and/or additionally, the determination (and/or the outcome of the determination) is applied/applicable to a next time occasion. Alternatively and/or additionally, the determination (and/or the outcome of the determination) is applied/applicable to a next slot. Alternatively and/or additionally, the determination (and/or the outcome of the determination) is applied/applicable to a next PDCCH monitoring occasion(s). Alternatively and/or additionally, the determination (and/or the outcome of the determination) is applied/applicable to a following time occasion (after the current time occasion). Alternatively and/or additionally, the determination (and/or the outcome of the determination) is applied/applicable to a following slot (after the current slot). Alternatively and/or additionally, the determination (and/or the outcome of the determination) is applied/applicable to a following PDCCH monitoring occasion (after the current PDCCH monitoring occasion). Alternatively and/or additionally, the determination (and/or the outcome of the determination) is applied/applicable after a period of time (after the determination is performed). Alternatively and/or additionally, the determination (and/or the outcome of the determination) is applied/applicable for a second period of time. In some examples, the period of time and/or the second period of time are fixed. Alternatively and/or additionally, the period of time and/or the second period of time are configured. Alternatively and/or additionally, the determination (and/or the outcome of the determination) is applied/applicable until a next determination (e.g., the determination and/or the outcome of the determination is applied/applicable until the next determination is performed). Alternatively and/or additionally, the determination (and/or the outcome of the determination) is applied/applicable until an indication from a base station is received. Alternatively and/or additionally, the determination (and/or the outcome of the determination) is applied/applicable until a timer expires.

In some examples, a previous time occasion(s), as used herein, comprises a fixed number of time occasions. Alternatively and/or additionally, a previous time occasion(s) comprises a configurable number of time occasion(s). Alternatively and/or additionally, a previous time occasion(s) corresponds to time occasion(s) preceding and/or directly before a current time occasion. Alternatively and/or additionally, a previous time occasion(s) corresponds to time occasion(s) at least a number of slot(s) before a current time occasion. Alternatively and/or additionally, a previous time occasion(s) corresponds to time occasion(s) at least a number of time occasion(s) before a current time occasion. Alternatively and/or additionally, a previous time occasion(s) corresponds to time occasion(s) at least a number of symbol(s) before a current time occasion. Alternatively and/or additionally, a previous time occasion(s) corresponds to time occasion(s) within a period of time. In some examples, the period of time has a configurable length. Alternatively and/or additionally, the period of time has a fixed length. In some examples, a previous time occasion(s) corresponds to time occasion(s) within a time window. In some examples, the time window has a fixed length. Alternatively and/or additionally, the time window has a configurable length. Alternatively and/or additionally, the time window is controlled by a timer.

A time occasion could be a slot. A time occasion could be a PDCCH monitoring occasion. A time occasion could be a TTI. A time occasion could be an OFDM symbol. A time occasion could be OFDM symbols. A time occasion could be a time duration of a CORESET.

A PDCCH for the UE could be a PDCCH (and/or any PDCCH) the UE received. A PDCCH for the UE could be a PDCCH specifically for the UE. A PDCCH for the UE could be associated with a RNTI(s). A PDCCH for the UE could be addressed to a RNTI(s). A PDCCH for the UE could be CRC-scrambled with a RNTI(s). In some examples, the RNTI(s) is configured for the UE. Alternatively and/or additionally, the RNTI(s) comprises C-RNTI. Alternatively and/or additionally, the RNTI(s) comprises CS-RNTI. Alternatively and/or additionally, the RNTI(s) comprises MCS-C-RNTI. Alternatively and/or additionally, the RNTI(s) comprises SP-CSI-RNTI. Alternatively and/or additionally, the RNTI(s) comprises TPC-PUSCH-RNTI. Alternatively and/or additionally, the RNTI(s) comprises TPC-PUCCH-RNTI. Alternatively and/or additionally, the RNTI(s) comprises TPC-SRS-RNTI. Alternatively and/or additionally, the RNTI(s) comprises TC-RNTI. Alternatively and/or additionally, the RNTI(s) comprises SFI-RNTI. Alternatively and/or additionally, the RNTI(s) comprises INT-RNTI. In some examples, a PDCCH for the UE schedules data transmission to the UE. In some examples, the data transmission is for DL data. In some examples, the data transmission is an UL data.

In some examples, a value, as used herein, could be a fixed value. Alternatively and/or additionally, a value could be a configurable value. Alternatively and/or additionally, a value could be a varying value. Alternatively and/or additionally, a value is received from a base station, e.g., via configuration. In some examples, a value is negotiated between the UE and a base station. In some examples, the UE recommends (and/or transmits) the value to a base station.

In some examples, a base station and a UE may have a same understanding regarding PDCCH monitoring occasion such that a base station could schedule a UE (properly). Alternatively and/or additionally, the base station and the UE may have different understandings if one or more errors occur. An example of an error is the UE miss-detects a PDCCH transmitted by the base station. Another example is a PDCCH false alarm, e.g., the base station does not transmit PDCCH for the UE while the UE decodes PDCCH successfully. Another example is a CRC residual error.

A base station and/or a UE determines a PDCCH monitoring pattern. The base station determines a PDCCH monitoring pattern for scheduling the UE. The UE determines a PDCCH monitoring pattern for monitoring PDCCH.

Throughout the present disclosure, the term "UE" could be replaced with the term "base station".

Determinations performed by a UE using one or more of the techniques and/or methods presented herein could be performed by a base station. A determination performed by a base station could be for an individual UE. A base station could perform different determinations for different UEs (e.g., the base station could perform a first determination for a first UE, and/or the base station could perform a second determination, different than the first determination, for a second UE). An example is given in the following embodiment.

In an embodiment, a base station transmits, to a UE, a configuration of a first value of a parameter related to PDCCH monitoring pattern (for a search space set) and a second value of the parameter related to PDCCH monitoring pattern (for the search space set). A value of the two values is used for the parameter in a period of time and the other value is not used for the parameter in the period of time. The parameter could be a duration of CORESET. The parameter could be a PDCCH monitoring offset. The parameter could be a PDCCH monitoring periodicity. The parameter could be a PDCCH monitoring pattern within a slot.

The base station could determine, for the UE, which of the first value or the second value is used for the parameter (to determine a PDCCH monitoring pattern) (for the search space set) (in a time occasion) based on PDCCH transmission (e.g., PDCCH transmission in a previous time occasion(s)).

The base station could determine, for the UE, which of the first value or the second value is used for the parameter (to determine a PDCCH monitoring pattern) (for the search space set) (in a time occasion) based on whether the base station transmits PDCCH for the UE in a previous time occasion(s) or not. For example, the base station determines, for the UE, the first value is used (for the DRX cycle) if the base station transmits PDCCH for the UE in the previous time occasion. Alternatively and/or additionally, the base station determines, for the UE, the second value is used (for the DRX cycle) if the base station did not transmit PDCCH for the UE in the previous time occasion.

The base station could determine, for the UE, which of the first value or the second value is used for the parameter (to determine a PDCCH monitoring pattern) (for the search space set) in a DRX cycle based on whether the base station has transmitted PDCCH for the UE in the DRX cycle or not. For example, the base station determines, for the UE, the first value is used (for the DRX cycle) if the base station has transmitted PDCCH for the UE in the DRX cycle. Alternatively and/or additionally, the base station determines, for the UE, the second value is used (for the DRX cycle) if the base station has not yet transmitted PDCCH for the UE in the DRX cycle.

The base station could determine, for the UE, which of the first value or the second value is used for the parameter (to determine a PDCCH monitoring pattern) (for the search space set) in a DRX cycle based on whether the base station transmitted PDCCH for the UE in a previous DRX cycle or not. For example, the base station determines, for the UE, the first value is used (for the DRX cycle) if the base station transmitted PDCCH for the UE in the previous DRX cycle. Alternatively and/or additionally, the base station determines, for the UE, the second value is used (for the DRX cycle) if the base station has not transmitted PDCCH for the UE in the previous DRX cycle.

The base station could determine, for the UE, which of the first value or the second value is used for the parameter (to determine a PDCCH monitoring pattern) (for the search space set) in an on duration based on whether the base station has transmitted PDCCH for the UE in the on duration or not. For example, the base station determines, for the UE, the first value is used (for the on duration) if the base station has transmitted PDCCH for the UE in the on duration. Alternatively and/or additionally, the base station determines, for the UE, the second value is used (for the on duration) if the base station has not yet transmitted PDCCH for the UE in the on duration.

The base station could determine, for the UE, which of the first value or the second value is used for the parameter (to determine a PDCCH monitoring pattern) (for the search space set) in an on duration based on whether the base station transmitted PDCCH for the UE in a previous DRX cycle or not. For example, the base station determines, for the UE, the first value is used (for the on duration) if the base station transmitted PDCCH for the UE in the previous DRX cycle. Alternatively and/or additionally, the base station determines, for the UE, the second value is used (for the on duration) if the base station did not transmit PDCCH for the UE in the previous DRX cycle.

The base station could determine, for the UE, which of the first value or the second value is used for the parameter (to determine a PDCCH monitoring pattern) (for the search space set) in an on duration based on whether the base station transmitted PDCCH for the UE in a previous on duration or not. For example, the base station determines, for the UE, the first value is used (for the on duration) if the base station transmitted PDCCH for the UE in the previous on duration. Alternatively and/or additionally, the base station determines, for the UE, the second value is used (for the on duration) if the base station did not transmit PDCCH for the UE in the previous on duration.

The base station could determine, for the UE, which of the first value or the second value is used for the parameter (to determine a PDCCH monitoring pattern) (for the search space set) (in a time occasion) based on a number of PDCCHs for the UE transmitted in a previous time occasion(s). For example, the base station determines, for the UE, the first value is used (for the DRX cycle) if the number of PDCCHs for the UE transmitted is greater than and/or equal to a third value. Alternatively and/or additionally, the base station determines, for the UE, the second value is used (for the DRX cycle) if the number of PDCCHs for the UE transmitted is less than and/or equal to the third value.

The base station could determine, for the UE, which of the first value or the second value is used for the parameter (to determine a PDCCH monitoring pattern) (for the search space set) (in a time occasion) based on a number of time occasion(s) when the base station transmitted PDCCH for the UE in previous time occasions. For example, the base station determines, for the UE, the first value is used (for the DRX cycle) if the number of time occasion(s) when the base station transmitted PDCCH for the UE is greater than and/or equal to a third value. Alternatively and/or additionally, the base station determines, for the UE, the second value is used (for the DRX cycle) if the number of time occasion(s) when the base station transmitted PDCCH for the UE is less than and/or equal to the third value.

The base station could determine, for the UE, which of the first value or the second value is used for the parameter (to determine a PDCCH monitoring pattern) (for the search space set) (in a time occasion) based on a proportion of time occasion(s) when the base station transmitted PDCCH for the UE in previous time occasions. For example, the base station determines, for the UE, the first value is used (for the DRX cycle) if the proportion of time occasion(s) when the base station transmitted PDCCH for the UE is greater than and/or equal to a third value. Alternatively and/or additionally, the base station determines, for the UE, the second value is used (for the DRX cycle) if the proportion of time occasion(s) when the base station transmitted PDCCH for the UE is less than and/or equal to the third value.

Figure 10:
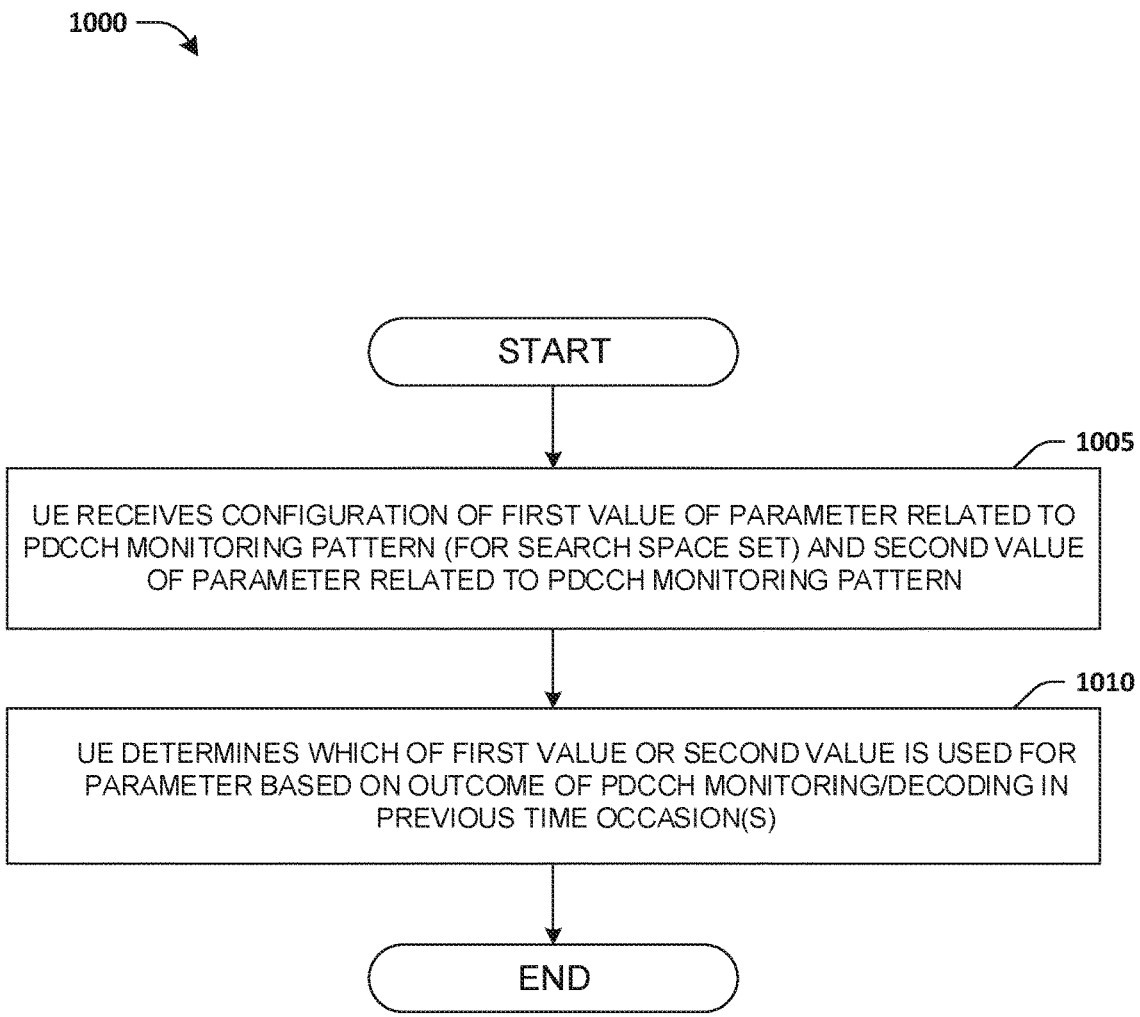
FIG. 10 is a flow chart according to one exemplary embodiment.

FIG. 10 is a flow chart 1000 according to one exemplary embodiment from the perspective of a UE. In step 1005, the UE receives configuration of a first value of a parameter related to PDCCH monitoring pattern (for a search space set) and a second value of the parameter related to PDCCH monitoring pattern. In step 1010, the UE determines which of the first value or the second value is used for the parameter based on an outcome of PDCCH monitoring/decoding in a previous time occasion(s).

In one embodiment, the parameter is a time duration of CORESET.

In one embodiment, the parameter is a PDCCH monitoring offset.

In one embodiment, the parameter is a PDCCH monitoring periodicity.

In one embodiment, the parameter could be a PDCCH monitoring pattern within a slot.

In one embodiment, the determination is based on whether the UE detects PDCCH for itself in a previous time occasion(s) or not.

In one embodiment, the determination is based on whether the UE has detected PDCCH for itself in a DRX cycle or not.

In one embodiment, the DRX cycle is a previous DRX cycle.

In one embodiment, the DRX cycle is a current DRX cycle.

In one embodiment, the determination is based on whether the UE has detected PDCCH for itself in an on duration or not.

In one embodiment, the on duration is a current on duration.

In one embodiment, the on duration is a previous on duration.

In one embodiment, the determination is based on a number of PDCCHs detected for the UE.

In one embodiment, the determination is based on a number of time occasion(s) when PDCCH for the UE is detected.

In one embodiment, the determination is based on a proportion of time occasion(s) when PDCCH for the UE is detected.

In one embodiment, the determination is applied for a current time occasion.

In one embodiment, the determination is applied for a following time occasion.

In one embodiment, the determination is applied for a period of time.

In one embodiment, the determination is applied until the next determination.

In one embodiment, the determination is performed for every time occasion.

In one embodiment, the determination is performed periodically.

In one embodiment, a previous time occasion(s) are within a time window.

Referring back to FIGS. 3 and 4, in one exemplary embodiment of a UE, the device 300 includes a program code 312 stored in the memory 310. The CPU 308 could execute program code 312 to enable the UE (i) to receive configuration of a first value of a parameter related to PDCCH monitoring pattern (for a search space set) and a second value of the parameter related to PDCCH monitoring pattern, and (ii) to determine which of the first value or the second value is used for the parameter based on an outcome of PDCCH monitoring/decoding in a previous time occasion(s). Furthermore, the CPU 308 can execute the program code 312 to perform one, some and/or all of the above-described actions and steps and/or others described herein.

Figure 11:
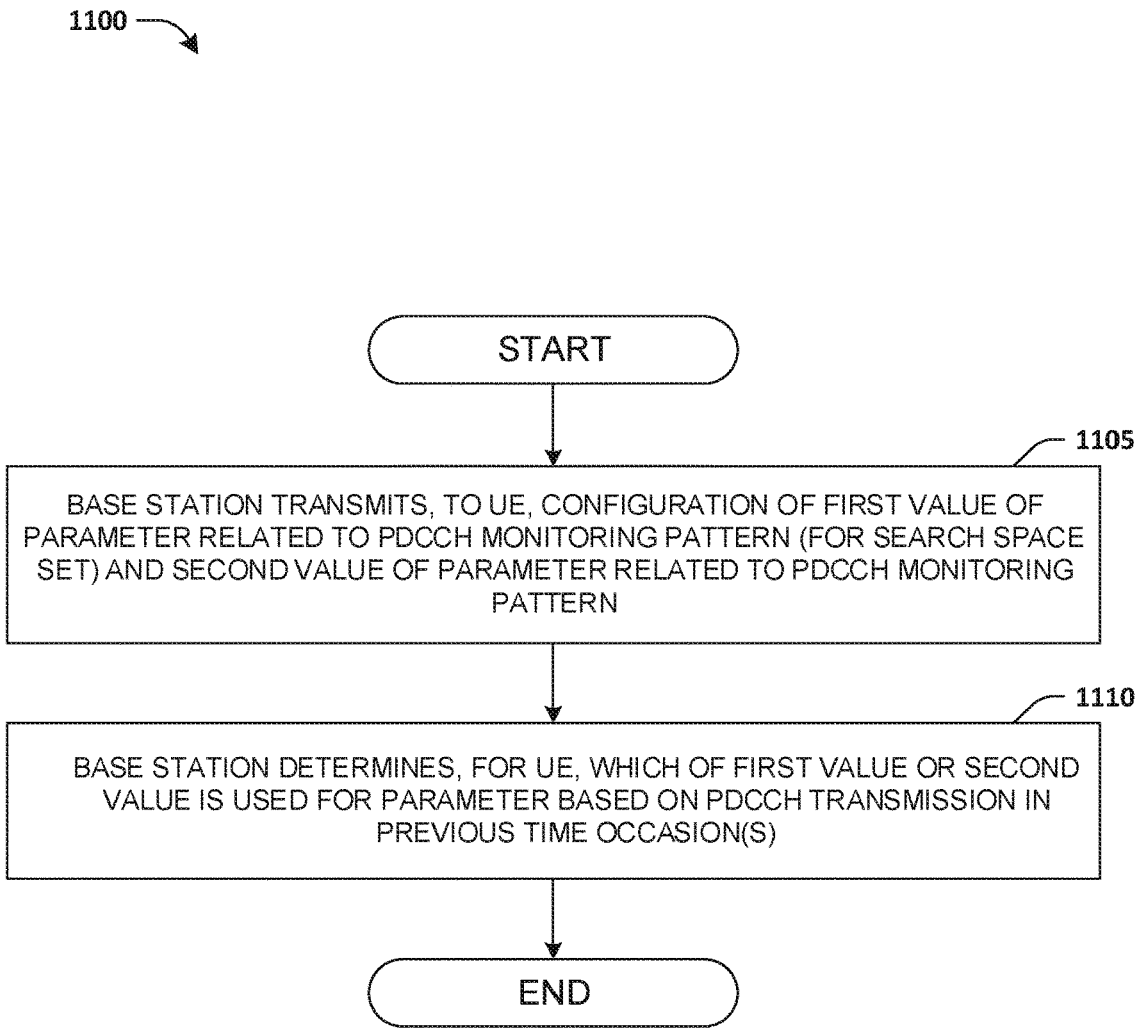
FIG. 11 is a flow chart according to one exemplary embodiment.

FIG. 11 is a flow chart 1100 according to one exemplary embodiment from the perspective of a base station. In step 1105, the base station transmits, to a UE, a configuration of a first value of a parameter related to PDCCH monitoring pattern (for a search space set) and a second value of the parameter related to PDCCH monitoring pattern. In step 1110, the base station determines, for the UE, which of the first value or the second value is used for the parameter based on PDCCH transmission in a previous time occasion(s).

In one embodiment, the parameter is a time duration of CORESET.

In one embodiment, the parameter is a PDCCH monitoring offset.

In one embodiment, the parameter is a PDCCH monitoring periodicity.

In one embodiment, the parameter could be a PDCCH monitoring pattern within a slot.

In one embodiment, the determination is based on whether the base station transmits PDCCH for the UE in a previous time occasion(s) or not.

In one embodiment, the determination is based on whether the base station has transmitted PDCCH for the UE in a DRX cycle or not.

In one embodiment, the DRX cycle is a previous DRX cycle.

In one embodiment, the DRX cycle is a current DRX cycle.

In one embodiment, the determination is based on whether the base station transmits PDCCH for the UE in an on duration or not.

In one embodiment, the on duration is a current on duration.

In one embodiment, the on duration is a previous on duration.

In one embodiment, the determination is based on a number of transmitted PDCCH for the UE.

In one embodiment, the determination is based on a number of time occasion(s) when the base station transmits PDCCH for the UE.

In one embodiment, the determination is based on a proportion of time occasion(s) when the base station transmits PDCCH for the UE.

In one embodiment, the determination is applied for a current time occasion.

In one embodiment, the determination is applied for a following time occasion.

In one embodiment, the determination is applied for a period of time.

In one embodiment, the determination is applied until the next determination.

In one embodiment, the determination is performed for every time occasion.

In one embodiment, the determination is performed periodically.

In one embodiment, a previous time occasion(s) are within a time window.

Referring back to FIGS. 3 and 4, in one exemplary embodiment of a base station, the device 300 includes a program code 312 stored in the memory 310. The CPU 308 could execute program code 312 to enable the base station (i) to transmit, to a UE, a configuration of a first value of a parameter related to PDCCH monitoring pattern (for a search space set) and a second value of the parameter related to PDCCH monitoring pattern, and (ii) to determine, for the UE, which of the first value or the second value is used for the parameter based on PDCCH transmission in a previous time occasion(s). Furthermore, the CPU 308 can execute the program code 312 to perform one, some and/or all of the above-described actions and steps and/or others described herein.

Figure 12:
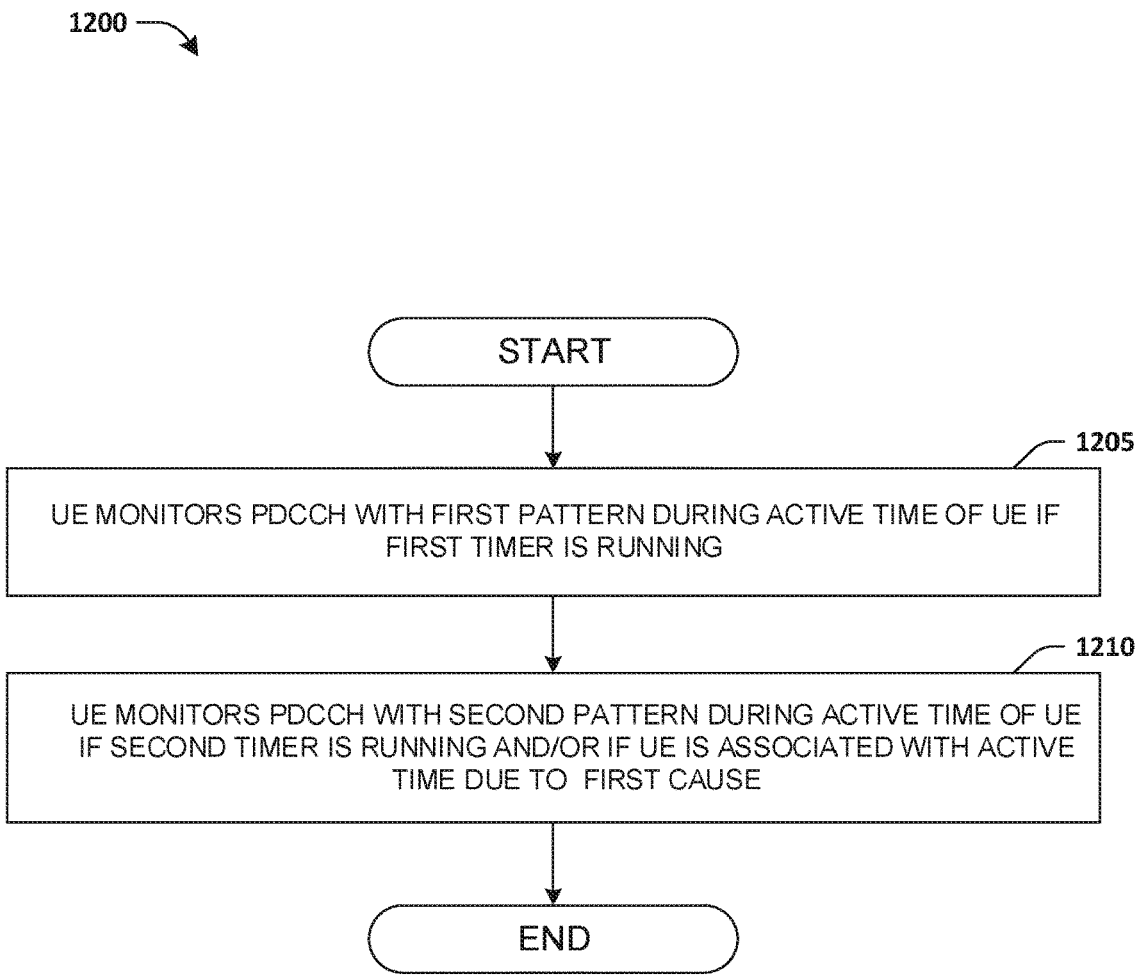
FIG. 12 is a flow chart according to one exemplary embodiment.

FIG. 12 is a flow chart 1200 according to one exemplary embodiment from the perspective of a UE. In step 1205, the UE monitors PDCCH with a first pattern during an active time of the UE if a first timer is running (e.g., the UE may monitor the PDCCH in the active time of the UE). In step 1210, the UE monitors the PDCCH with a second pattern during the active time of the UE if a second timer is running and/or if the UE is associated with the active time due to a first cause (e.g., the UE is in the active time due to the first cause).

In one embodiment, the first timer is an on duration timer.

In one embodiment, the second timer is an inactivity timer.

In one embodiment, the UE monitors PDCCH with the first pattern during the active time of the UE if the second timer is not running.

In one embodiment, the first cause comprises a scheduling request being transmitted on PUCCH.

In one embodiment, the first pattern corresponds to (and/or is characterized by) a first duration of a CORESET, a first PDCCH monitoring offset, a first PDCCH monitoring periodicity and/or a first PDCCH monitoring pattern within a slot.

In one embodiment, the second pattern corresponds to (and/or is characterized by) a second duration of a CORESET, a second PDCCH monitoring offset, a second PDCCH monitoring periodicity and/or a second PDCCH monitoring pattern within a slot.

Referring back to FIGS. 3 and 4, in one exemplary embodiment of a UE, the device 300 includes a program code 312 stored in the memory 310. The CPU 308 could execute program code 312 to enable the UE (i) to monitor PDCCH with a first pattern during an active time of the UE if a first timer is running, and (ii) to monitor the PDCCH with a second pattern during the active time of the UE if a second timer is running and/or if the UE is associated with the active time due to a first cause. Furthermore, the CPU 308 can execute the program code 312 to perform one, some and/or all of the above-described actions and steps and/or others described herein.

Figure 13:
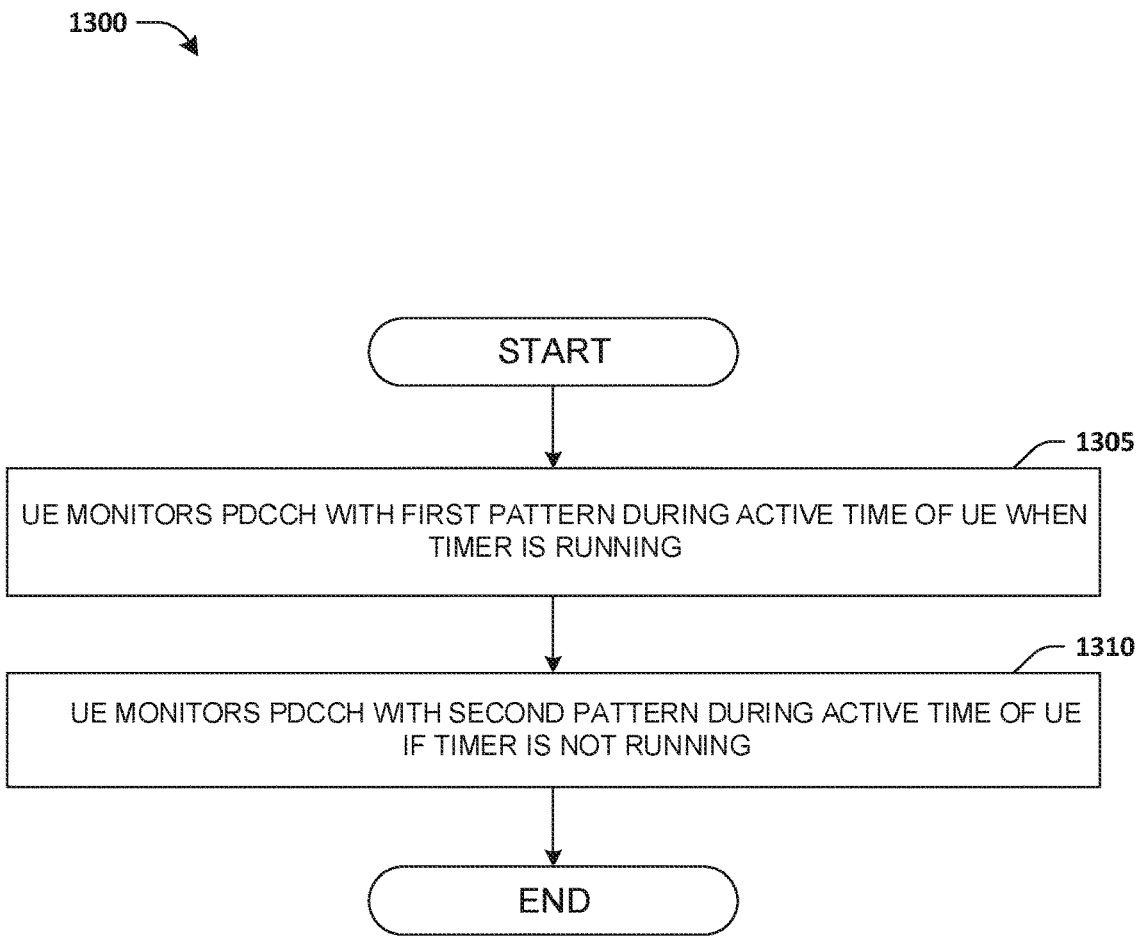
FIG. 13 is a flow chart according to one exemplary embodiment.

FIG. 13 is a flow chart 1300 according to one exemplary embodiment from the perspective of a UE. In step 1305, the UE monitors PDCCH with a first pattern during an active time of the UE when a timer is running. In step 1310, the UE monitors the PDCCH with a second pattern during the active time of the UE if the timer is not running.

In one embodiment, the timer is an inactivity timer.

In one embodiment, the first pattern corresponds to (and/or is characterized by) a first duration of a CORESET, a first PDCCH monitoring offset, a first PDCCH monitoring periodicity and/or a first PDCCH monitoring pattern within a slot.

In one embodiment, the second pattern corresponds to (and/or is characterized by) a second duration of a CORESET, a second PDCCH monitoring offset, a second PDCCH monitoring periodicity and/or a second PDCCH monitoring pattern within a slot.

Referring back to FIGS. 3 and 4, in one exemplary embodiment of a UE, the device 300 includes a program code 312 stored in the memory 310. The CPU 308 could execute program code 312 to enable the UE (i) to monitor PDCCH with a first pattern during an active time of the UE when a timer is running, and (ii) to monitor the PDCCH with a second pattern during the active time of the UE if the timer is not running. Furthermore, the CPU 308 can execute the program code 312 to perform one, some and/or all of the above-described actions and steps and/or others described herein.

Figure 14:
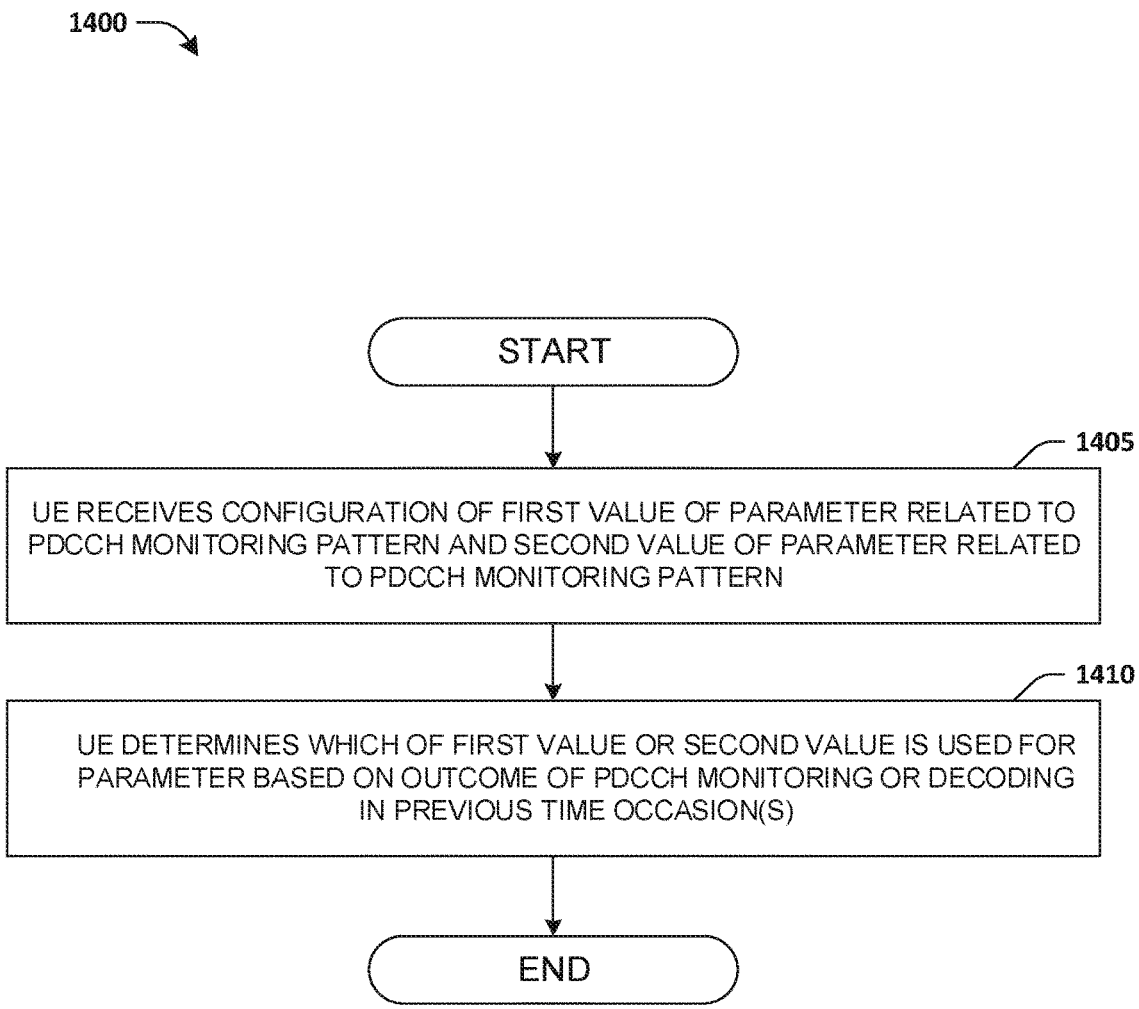
FIG. 14 is a flow chart according to one exemplary embodiment.

FIG. 14 is a flow chart 1400 according to one exemplary embodiment from the perspective of a UE. In step 1405, the UE receives a configuration of a first value of a parameter related to PDCCH monitoring pattern and a second value of the parameter related to PDCCH monitoring pattern. In step 1410, the UE determines which of the first value or the second value is used for the parameter based on an outcome of PDCCH monitoring or decoding in a previous time occasion(s).

In one embodiment, the parameter is one of a time duration of CORESET, a PDCCH monitoring offset, a PDCCH monitoring periodicity or a PDCCH monitoring pattern within a slot.

In one embodiment, the determination is based on whether the UE has detected PDCCH for itself in an on duration or not.

In one embodiment, the determination is based on a number of PDCCHs detected for the UE.

In one embodiment, the determination is based on a number of time occasion(s) when PDCCH for the UE is detected.

In one embodiment, the determination is based on a proportion of time occasion(s) when PDCCH for the UE is detected.

In one embodiment, a previous time occasion(s) are within a time window.

In one embodiment, the UE determines the first value is used for the parameter if PDCCH for the UE is not detected in an on duration and the UE determines the second value is used for the parameter if PDCCH for the UE is detected in the on duration.

In one embodiment, the UE determines the first value is used for the parameter if a number of PDCCHs detected for the UE is not more than a threshold and the UE determines the second value is used for the parameter if the number of PDCCHs detected for the UE is more than a threshold.

In one embodiment, the UE determines the first value is used for the parameter if a number of time occasion(s) when PDCCH for the UE is detected is not more than a threshold and the UE determines the second value is used for the parameter if the number of time occasion(s) when PDCCH for the UE is detected is more than a threshold.

In one embodiment, the UE determines the first value is used for the parameter if a proportion of time occasion(s) when PDCCH for the UE is detected is not more than a threshold and the UE determines the second value is used for the parameter if the proportion of time occasion(s) when PDCCH for the UE is detected is more than a threshold.

Referring back to FIGS. 3 and 4, in one exemplary embodiment of a UE, the device 300 includes a program code 312 stored in the memory 310. The CPU 308 could execute program code 312 to enable the UE (i) to receive a configuration of a first value of a parameter related to PDCCH monitoring pattern and a second value of the parameter related to PDCCH monitoring pattern, and (ii) to determine which of the first value or the second value is used for the parameter based on an outcome of PDCCH monitoring or decoding in a previous time occasion(s). Furthermore, the CPU 308 can execute the program code 312 to perform one, some and/or all of the above-described actions and steps and/or others described herein.

Figure 15:
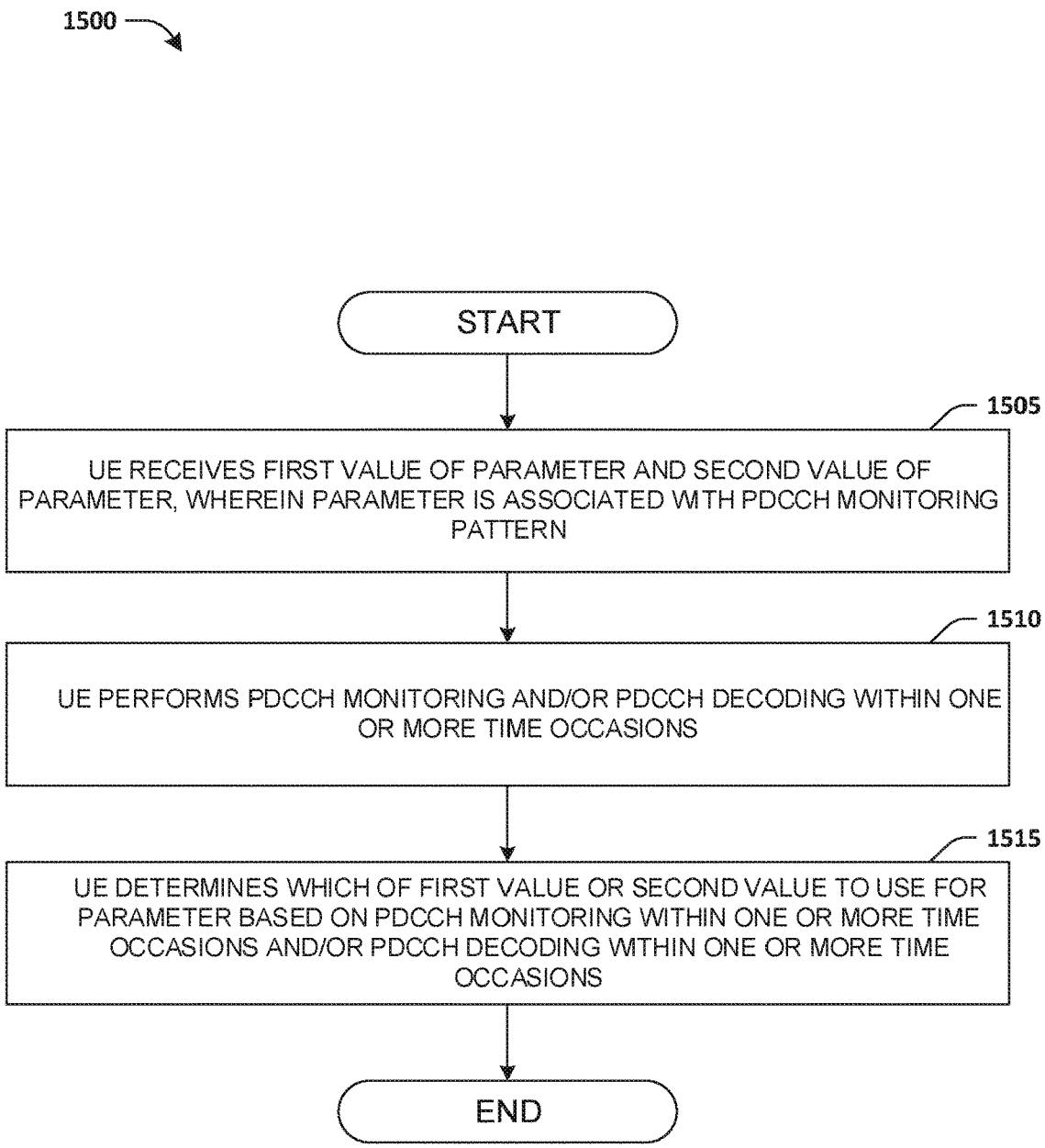
FIG. 15 is a flow chart according to one exemplary embodiment.

FIG. 15 is a flow chart 1500 according to one exemplary embodiment from the perspective of a UE. In step 1505, the UE receives a first value of a parameter and a second value of the parameter, wherein the parameter is associated with a PDCCH monitoring pattern. In step 1510, the UE performs PDCCH monitoring and/or PDCCH decoding within one or more time occasions. In step 1515, the UE determines which of the first value or the second value to use for the parameter based on the PDCCH monitoring within the one or more time occasions and/or the PDCCH decoding within the one or more time occasions (e.g., the UE may determine which of the first value or the second value to use for the parameter based on an outcome of the PDCCH monitoring within the one or more time occasions and/or the PDCCH decoding within the one or more time occasions).

In one embodiment, the parameter comprises a time duration of a CORESET, a PDCCH monitoring offset, a PDCCH monitoring periodicity and/or a PDCCH monitoring pattern within a slot.

In one embodiment, the determination (e.g., the determining which of the first value or the second value to use for the parameter) is performed based on whether the UE detects a PDCCH, associated with the UE (e.g., for the UE), within an on duration during the one or more time occasions.

In one embodiment, the determination (e.g., the determining which of the first value or the second value to use for the parameter) is performed based on a number of PDCCHs associated with the UE detected during the one or more time occasions.

In one embodiment, the determination (e.g., the determining which of the first value or the second value to use for the parameter) is performed based on a number of one or more second time occasions, of the one or more time occasions, wherein a PDCCH associated with the UE is detected within each time occasion of the one or more second time occasions.

In one embodiment, the determination (e.g., the determining which of the first value or the second value to use for the parameter) is performed based on a proportion of one or more second time occasions, of the one or more time occasions, with respect to the one or more time occasions, wherein a PDCCH associated with the UE is detected within each time occasion of the one or more second time occasions (e.g., if the one or more second time occasions within which one or more PDCCHs associated with the UE are detected comprise 5 time occasions and/or if the one or more time occasions comprise 10 time occasions, the proportion may correspond to half of the one or more time occasions, 50% of the one or more time occasions, etc.).

In one embodiment, the one or more time occasions are within a time window.

In one embodiment, the UE determines to use the first value for the parameter if a PDCCH associated with the UE is not detected within an on duration during the one or more time occasions. Alternatively and/or additionally, the UE determines to use the second value for the parameter if a PDCCH associated with the UE is detected within an on duration during the one or more time occasions.

In one embodiment, the UE determines to use the first value for the parameter if a number of PDCCHs associated with the UE detected during the one or more time occasions does not meet a threshold value (e.g., the number of PDCCHs may not meet the threshold value if the number of PDCCHs is less than and/or equal to the threshold value). Alternatively and/or additionally, the UE determines to use the second value for the parameter if the number of PDCCHs associated with the UE detected during the one or more time occasions meets the threshold value (e.g., the number of PDCCHs may meet the threshold value if the number of PDCCHs is greater than and/or equal to the threshold value).

In one embodiment, the UE determines to use the first value for the parameter if a number of one or more second time occasions, of the one or more time occasions, does not meet a threshold value, wherein a PDCCH associated with the UE is detected within each time occasion of the one or more second time occasions (e.g., the number of the one or more second time occasions may not meet the threshold value if the number of the one or more second time occasions is less than and/or equal to the threshold value). Alternatively and/or additionally, the UE determines to use the second value for the parameter if the number of the one or more second time occasions meets the threshold value (e.g., the number of the one or more second time occasions may meet the threshold value if the number of the one or more second time occasions is greater than and/or equal to the threshold value).

In one embodiment, the UE determines to use the first value for the parameter if a proportion of one or more second time occasions, of the one or more time occasions, with respect to the one or more time occasions does not meet a threshold value, wherein a PDCCH associated with the UE is detected within each time occasion of the one or more second time occasions (e.g., the proportion may not meet the threshold value if the proportion is less than and/or equal to the threshold value). Alternatively and/or additionally, the UE determines to use the second value for the parameter if the proportion meets the threshold value (e.g., the proportion may meet the threshold value if the proportion is greater than and/or equal to the threshold value).

Referring back to FIGS. 3 and 4, in one exemplary embodiment of a UE, the device 300 includes a program code 312 stored in the memory 310. The CPU 308 could execute program code 312 to enable the UE (i) to receive a first value of a parameter and a second value of the parameter, wherein the parameter is associated with a PDCCH monitoring pattern, (ii) to perform PDCCH monitoring and/or PDCCH decoding within one or more time occasions, and (iii) to determine which of the first value or the second value to use for the parameter based on the PDCCH monitoring within the one or more time occasions and/or the PDCCH decoding within the one or more time occasions. Furthermore, the CPU 308 can execute the program code 312 to perform one, some and/or all of the above-described actions and steps and/or others described herein.

It may be appreciated that applying one or more of the techniques presented herein may result in one or more benefits including, but not limited to, improving efficiency and/or reducing power consumption by more efficiently adapting PDCCH monitoring patterns for various functionalities and/or operations of a device, such as in a DRX related procedure.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in one or more of FIGS. 10-15. Furthermore, the processor may execute the program code to perform one, some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/ processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a user equipment (UE), the method comprising:
monitoring Physical Downlink Control Channel (PDCCH) with a first pattern during an active time of the UE when a timer is running, wherein the first pattern corresponds to at least one of a first control resource set (CORESET) duration, a first PDCCH monitoring offset or a first PDCCH monitoring periodicity; and
monitoring the PDCCH with a second pattern, different than the first pattern, during the active time of the UE if the timer is not running, wherein the second pattern corresponds to at least one of a second CORESET duration, a second PDCCH monitoring offset or a second PDCCH monitoring periodicity.

2. The method of claim 1, wherein:
the timer is an inactivity timer.

3. A method of a user equipment (UE), the method comprising:
receiving a first value of a parameter and a second value of the parameter, wherein the parameter is associated with a Physical Downlink Control Channel (PDCCH) monitoring pattern;
performing at least one of PDCCH monitoring or PDCCH decoding within one or more time occasions; and
based on at least one of the PDCCH monitoring or the PDCCH decoding, determining which value to use for the parameter from among a plurality of values comprising the first value and the second value.

4. The method of claim 3, wherein:
the parameter comprises at least one of a time duration of a control resource set (CORESET), a PDCCH monitoring offset, a PDCCH monitoring periodicity or a PDCCH monitoring pattern within a slot.

5. The method of claim 3, wherein:
the determining which of the first value or the second value to use for the parameter is performed based on whether the UE detects a PDCCH, associated with the UE, within an on duration during the one or more time occasions.

6. The method of claim 3, wherein at least one of:
the determining which of the first value or the second value to use for the parameter is performed based on a number of PDCCHs associated with the UE detected during the one or more time occasions.

7. The method of claim 3, wherein:
the determining which of the first value or the second value to use for the parameter is performed based on a number of one or more second time occasions, of the one or more time occasions, wherein a PDCCH associated with the UE is detected within each time occasion of the one or more second time occasions.

8. The method of claim 3, wherein:
the determining which of the first value or the second value to use for the parameter is performed based on a proportion of one or more second time occasions, of the one or more time occasions, with respect to the one or more time occasions, wherein a PDCCH associated with the UE is detected within each time occasion of the one or more second time occasions.

9. The method of claim 3, wherein:
the one or more time occasions are within a time window.

10. The method of claim 3, wherein:
the first value is determined to be used for the parameter if a PDCCH associated with the UE is not detected within an on duration during the one or more time occasions; and
the second value is determined to be used for the parameter if a PDCCH associated with the UE is detected within an on duration during the one or more time occasions.

11. The method of claim 3, wherein:
the first value is determined to be used for the parameter if a number of PDCCHs associated with the UE detected during the one or more time occasions does not meet a threshold value; and the second value is determined to be used for the parameter if the number of PDCCHs associated with the UE detected during the one or more time occasions meets the threshold value.

12. The method of claim 3, wherein:
the first value is determined to be used for the parameter if a number of one or more second time occasions, of the one or more time occasions, does not meet a threshold value, wherein a PDCCH associated with the UE is detected within each time occasion of the one or more second time occasions; and
the second value is determined to be used for the parameter if the number of the one or more second time occasions meets the threshold value.

13. The method of claim 3, wherein:
the first value is determined to be used for the parameter if a proportion of one or more second time occasions, of the one or more time occasions, with respect to the one or more time occasions does not meet a threshold value, wherein a PDCCH associated with the UE is detected within each time occasion of the one or more second time occasions; and
the second value is determined to be used for the parameter if the proportion meets the threshold value.

14. The method of claim 1, wherein:
the timer is started or restarted when the PDCCH for the UE is detected.

* * * * *